US012306579B2

(12) United States Patent
Sato et al.

(10) Patent No.: US 12,306,579 B2
(45) Date of Patent: May 20, 2025

(54) TONER

(71) Applicant: CANON KABUSHIKI KAISHA, Tokyo (JP)

(72) Inventors: Kazuyuki Sato, Kanagawa (JP); Tomohisa Sano, Shizuoka (JP); Daisuke Yoshiba, Shizuoka (JP); Tohru Hiramatsu, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 615 days.

(21) Appl. No.: 17/524,353

(22) Filed: Nov. 11, 2021

(65) Prior Publication Data

US 2022/0171302 A1 Jun. 2, 2022

(30) Foreign Application Priority Data

Nov. 30, 2020 (JP) ................................ 2020-199150

(51) Int. Cl.

*G03G 9/08* (2006.01)
*G03G 9/083* (2006.01)
*G03G 9/087* (2006.01)
*G03G 9/097* (2006.01)

(52) U.S. Cl.

CPC ......... *G03G 9/0825* (2013.01); *G03G 9/0819* (2013.01); *G03G 9/0839* (2013.01); *G03G 9/08711* (2013.01); *G03G 9/08755* (2013.01); *G03G 9/09733* (2013.01)

(58) Field of Classification Search

CPC .. G03G 9/0825; G03G 9/0819; G03G 9/0839; G03G 9/08711; G03G 9/08755; G03G 9/09733

See application file for complete search history.

(56) References Cited

U.S. PATENT DOCUMENTS

| | | | |
|---|---|---|---|
| 7,123,862 | B2 | 10/2006 | Hasegawa et al. |
| 7,537,877 | B2 | 5/2009 | Yoshiba et al. |
| 7,544,455 | B2 | 6/2009 | Yoshiba et al. |
| 7,582,401 | B2 | 9/2009 | Ogawa et al. |
| 7,678,523 | B2 | 3/2010 | Hiroko et al. |
| 7,678,524 | B2 | 3/2010 | Hasegawa et al. |
| 7,700,254 | B2 | 4/2010 | Moribe et al. |
| 7,740,998 | B2 | 6/2010 | Yamazaki et al. |
| 7,796,926 | B2 | 9/2010 | Matsuda et al. |
| 7,855,042 | B2 | 12/2010 | Kobori et al. |
| 7,923,190 | B2 | 4/2011 | Magome et al. |
| 7,935,467 | B2 | 5/2011 | Dojo et al. |
| 8,057,977 | B2 | 11/2011 | Moribe et al. |
| 8,227,162 | B2 | 7/2012 | Sano et al. |
| 8,426,091 | B2 | 4/2013 | Magome et al. |
| 8,426,094 | B2 | 4/2013 | Magome et al. |
| 8,518,620 | B2 | 8/2013 | Dojo et al. |
| 8,614,044 | B2 | 12/2013 | Matsui et al. |
| 8,778,585 | B2 | 7/2014 | Matsui et al. |
| 8,841,054 | B2 | 9/2014 | Dojo et al. |
| 9,097,998 | B2 | 8/2015 | Yamazaki et al. |
| 9,128,400 | B2 | 9/2015 | Takahashi et al. |
| 9,152,065 | B2 | 10/2015 | Sano et al. |
| 9,201,323 | B2 | 12/2015 | Nishikawa et al. |
| 9,235,151 | B2 | 1/2016 | Tanaka et al. |
| 9,250,548 | B2 | 2/2016 | Nomura et al. |
| 9,261,804 | B2 | 2/2016 | Yamazaki et al. |
| 9,341,970 | B2 | 5/2016 | Yoshiba et al. |
| 9,377,708 | B2 | 6/2016 | Magome et al. |
| 9,551,947 | B2 | 1/2017 | Hiroko et al. |
| 9,606,462 | B2 | 3/2017 | Nomura et al. |
| 9,804,514 | B2 | 10/2017 | Suzumura et al. |
| 9,804,519 | B2 | 10/2017 | Suzumura et al. |
| 9,829,818 | B2 | 11/2017 | Yoshiba et al. |
| 9,841,692 | B2 | 12/2017 | Hasegawa et al. |
| 9,880,478 | B2 | 1/2018 | Shimano et al. |
| 9,927,728 | B2 | 3/2018 | Arimura et al. |
| 9,946,179 | B2 | 4/2018 | Arimura et al. |
| 9,946,181 | B2 | 4/2018 | Hasegawa et al. |
| 9,964,874 | B2 | 5/2018 | Suzumura et al. |
| 9,964,881 | B2 | 5/2018 | Ikejiri et al. |
| 9,971,262 | B2 | 5/2018 | Hasegawa et al. |
| 9,971,263 | B2 | 5/2018 | Fukudome et al. |
| 9,971,264 | B2 | 5/2018 | Sano et al. |

(Continued)

FOREIGN PATENT DOCUMENTS

| | | |
|---|---|---|
| CN | 104756016 A | 7/2015 |
| CN | 107783386 A | 3/2018 |

(Continued)

OTHER PUBLICATIONS

U.S. Appl. No. 16/910,301, Daisuke Yoshiba, filed Jun. 24, 2020.
U.S. Appl. No. 17/530,670, Tohru Hiramatsu, filed Nov. 19, 2021.

*Primary Examiner* — Peter L Vajda
*Assistant Examiner* — Boone Alexander Evans
(74) *Attorney, Agent, or Firm* — VENABLE LLP

(57) ABSTRACT

The toner is a toner including a toner particle comprising a binder resin, a crystalline material, wherein, when a ratio of an area occupied by the crystalline material in a toner surface observed with a scanning electron microscope after ruthenium-staining the toner under a specific condition (1) is represented by $S_1$ (%), a ratio of an area occupied by the crystalline material in the toner surface observed with the scanning electron microscope after ruthenium-staining the toner under a condition (2) is represented by $S_2$ (%), and a dispersion diameter of a plurality of domains formed of the crystalline material on the toner surface observed with the scanning electron microscope after the ruthenium-staining the toner under the condition (2) is represented by $R_2$ (nm), the following expressions (1), (2), and (3) are satisfied.

$$0.0 \leq S_1 \leq 0.5 \quad (1)$$

$$1.0 \leq S_2 \leq 10.0 \quad (2)$$

$$20 \leq R_2 \leq 200 \quad (3)$$

8 Claims, No Drawings

(56) References Cited

U.S. PATENT DOCUMENTS

| | | | |
|---|---|---|---|
| 10,012,923 | B2 | 7/2018 | Sano et al. |
| 10,101,683 | B2 | 10/2018 | Nishikawa et al. |
| 10,151,990 | B2 | 12/2018 | Suzuki et al. |
| 10,228,627 | B2 | 3/2019 | Nagashima et al. |
| 10,289,016 | B2 | 5/2019 | Fukudome et al. |
| 10,295,920 | B2 | 5/2019 | Nishikawa et al. |
| 10,295,921 | B2 | 5/2019 | Ohmori et al. |
| 10,303,075 | B2 | 5/2019 | Tanaka et al. |
| 10,310,397 | B2 | 6/2019 | Sano et al. |
| 10,545,420 | B2 | 1/2020 | Kinumatsu et al. |
| 10,578,990 | B2 | 3/2020 | Tsuda et al. |
| 10,698,327 | B2 | 6/2020 | Nagashima et al. |
| 10,732,529 | B2 | 8/2020 | Yoshiba et al. |
| 10,782,623 | B2 | 9/2020 | Yoshiba et al. |
| 10,942,463 | B2 | 3/2021 | Yoshiba et al. |
| 11,079,695 | B2 | 8/2021 | Sato et al. |
| 11,099,493 | B2 | 8/2021 | Komiya et al. |
| 11,181,844 | B2 | 11/2021 | Nagaoka et al. |
| 2005/0209364 | A1 | 9/2005 | Yamagishi et al. |
| 2006/0121379 | A1 | 6/2006 | Dojo et al. |
| 2009/0197192 | A1 | 8/2009 | Hiroko et al. |
| 2013/0252167 | A1 | 9/2013 | Moribe et al. |
| 2014/0004460 | A1 | 1/2014 | Yoshiba et al. |
| 2015/0212444 | A1 | 7/2015 | Yamauchi et al. |
| 2015/0220013 | A1 | 8/2015 | Nishikawa et al. |
| 2016/0161874 | A1 | 6/2016 | Yamazaki et al. |
| 2016/0378003 | A1 | 12/2016 | Arimura et al. |
| 2017/0307993 | A1 | 10/2017 | Sano |
| 2017/0336727 | A1 | 11/2017 | Ikejiri |
| 2018/0059562 | A1 | 3/2018 | Kadokura et al. |
| 2019/0041763 | A1* | 2/2019 | Tsuda ................. G03G 9/08702 |
| 2020/0363744 | A1 | 11/2020 | Yamashita |
| 2020/0363745 | A1 | 11/2020 | Nagata |
| 2022/0026822 | A1 | 1/2022 | Sato et al. |
| 2022/0026823 | A1 | 1/2022 | Sano et al. |

FOREIGN PATENT DOCUMENTS

| | | | |
|---|---|---|---|
| CN | 111929999 | A | 11/2020 |
| JP | 2016-126075 | A | 7/2016 |
| JP | 2016-180911 | A | 10/2016 |
| JP | 2017-3779 | A | 1/2017 |
| JP | 2017-40845 | A | 2/2017 |

* cited by examiner

TONER

BACKGROUND OF THE INVENTION

Field of the Invention

The present disclosure relates to a toner to be used in an image forming method, such as an electrophotographic method.

Description of the Related Art

An electrophotographic technology is a technology for forming an electrostatic latent image on a uniformly charged photosensitive member and visualizing image information with charged toner, and is utilized in apparatus, such as a copying machine and a printer. In recent years, the copying machine and the printer have been utilized in new market areas, and hence it has been required to stably provide high-quality images in response to various usage modes (e.g., a usage environment and various kinds of media). Meanwhile, a toner is required to have further improved low-temperature fixability from the viewpoints of an increase in speed and energy saving.

In Japanese Patent Application Laid-Open No. 2017-003779, there is a description of a toner in which the existence position of a crystalline resin existing in a central direction from the surface of a toner particle is defined. Domains of the crystalline resin in a fixed image that cause a decrease in toughness can be reduced, and hence a toner capable of being fixed at low temperature while suppressing a decrease in bending strength of an image can be provided.

In Japanese Patent Application Laid-Open No. 2016-126075, there is a description of a toner including a shell layer formed of a thermosetting resin and a thermoplastic resin having a defined structure. Through use of an amino resin made of a melamine resin, a urea resin, or a glyoxal resin as the thermosetting resin, a toner excellent in color developability, heat-resistant storage stability, charging stability, and image density stability can be provided.

SUMMARY OF THE INVENTION

The toner described in Japanese Patent Application Laid-Open No. 2017-003779 has an effect of achieving both the low-temperature fixability of the toner and the fluidity of powder. However, it has been found that, in a medium having large irregularities, there is a significant difference in plasticization of the toner by a crystalline material between a protruding portion and a recessed portion of the medium, with the result that the toner may cause image unevenness.

The toner described in Japanese Patent Application Laid-Open No. 2016-126075 is excellent in color developability, heat-resistant storage stability, charging stability, and image density stability. However, it has been found that, in a medium having large irregularities, there is a significant difference in plasticization of the toner by a crystalline material between a protruding portion and a recessed portion of the medium, with the result that the toner may cause image unevenness.

For the above-mentioned reasons, the present disclosure provides a toner, which is excellent in low-temperature fixability and significantly relieves image unevenness in a medium having large irregularities.

The present disclosure relates to a toner including a toner particle comprising a binder resin, a crystalline material, and a colorant, wherein, when a ratio of an area occupied by the crystalline material per area of a toner surface observed with a scanning electron microscope (SEM) after ruthenium staining the toner under the following condition (1) is represented by $S_1$ (%), a ratio of an area occupied by the crystalline material per area of the toner surface observed with the scanning electron microscope (SEM) after ruthenium-staining the toner under the following condition (2) is represented by $S_2$ (%), and a dispersion diameter of a plurality of domains formed of the crystalline material on the toner surface observed with the scanning electron microscope (SEM) after the ruthenium-staining the toner under the following condition (2) is represented by $R_2$ (nm), the following expressions (1), (2), and (3) are satisfied:

$$0.0 \leq S_1 \leq 0.5 \tag{1}$$

$$1.0 \leq S_2 \leq 10.0 \tag{2}$$

$$20 \leq R_2 \leq 200 \tag{3}$$

where the condition (1) comprises treating the toner in a ruthenium tetroxide ($RuO_4$) gas atmosphere at 100 Pa for 5 minutes, and the condition (2) comprises treating the toner in the ruthenium tetroxide ($RuO_4$) gas atmosphere at 500 Pa for 15 minutes.

According to the present disclosure, the toner, which is excellent in low-temperature fixability and significantly relieves image unevenness in a medium having large irregularities, can be provided.

Further features of the present invention will become apparent from the following description of exemplary embodiments.

DESCRIPTION OF THE EMBODIMENTS

The description "XX or more and YY or less" or "XX to YY" representing a numerical range means a numerical range including a lower limit and an upper limit that are end points unless otherwise stated.

When the numerical ranges are described in a stepwise manner, the upper and lower limits of each numerical range may be arbitrarily combined.

Now, the present disclosure is described in detail.

An improvement in low-temperature fixability of a toner is influenced significantly by the existence position of a crystalline material in the toner as well as the kind and amount of the crystalline material, and the toner can be more efficiently plasticized with heat caused by fixing as the crystalline material exists closer to the surface of the toner. However, when the crystalline material exists on the surface of the toner, the fluidity of the toner is deteriorated. Accordingly, as a method of achieving both the low-temperature fixability and the fluidity, there has hitherto been known a procedure for forming a shell layer on a toner core containing the crystalline material.

When the shell layer is formed on the toner core containing the crystalline material, the deterioration of the fluidity of the toner can be suppressed before its fixing, and the crystalline material exudes to the surface at the time of the fixing to plasticize a binder resin on the surface, thereby enabling the performance of low-temperature fixing. However, it has been found that the toner may cause image unevenness in a medium having large irregularities (low smoothness).

When the toner is fixed in a medium having large irregularities, a large amount of heat and high pressure are applied to the toner in a protruding portion, and hence the crystalline material excessively exudes to plasticize the binder resin. Because of this, the toner is deformed significantly. Meanwhile, heat and pressure are not easily applied to the toner in a recessed portion, and the exudation of the crystalline material is suppressed to suppress plasticization of the binder resin. Because of this, deformation of the toner is small. It is conceived that image unevenness is caused by the difference in toner deformation in fixing between the protruding portion and the recessed portion.

In view of the foregoing, the inventors of the present invention have considered that, when the excess exudation of the crystalline material can be suppressed in the protruding portion of a medium, the problem of the occurrence of image unevenness in a medium having large irregularities may be solved.

The inventors of the present invention have made extensive investigations, and as a result, have found that the problem of the occurrence of image unevenness in a medium having large irregularities can be solved by providing a large difference in amount of the crystalline material between the outermost surface (first surface region) of the toner and the vicinity of the surface (second surface region) thereof, and decreasing the particle diameter of the crystalline material in the vicinity of the surface.

Herein, in the toner of the present disclosure, the outermost surface (first surface region) of the toner refers to a toner surface observed with a SEM in a toner treated under the condition (1), and the vicinity of the surface (second surface region) of the toner refers to a toner surface observed with the SEM in a toner treated under the condition (2).

Specifically, in the toner of the present disclosure, a ratio $S_1$ (%) of an area occupied by the crystalline material per area of a toner surface observed with the SEM after ruthenium-staining the toner by being treated in a ruthenium tetroxide gas atmosphere at 100 Pa for 5 minutes is 0.0 or more and 0.5 or less. Although the detail of measurement is described later, when the toner is subjected to staining under a ruthenium tetroxide gas atmosphere at low pressure, the crystalline material existing on the outermost surface (first surface region) of the toner can be visualized. As a method of controlling the ratio $S_1$ of the area occupied by the crystalline material, there are given control of the amounts of an unreacted hydrophobizing agent and a low-molecular weight hydrophobizing agent condensate to be described later, a toner core shell structure, and the like.

In addition, in the toner of the present disclosure, a ratio $S_2$ (%) of an area occupied by the crystalline material per area of the toner surface observed with the SEM after ruthenium-staining the toner by being treated in a ruthenium tetroxide gas atmosphere at 500 Pa for 15 minutes is 1.0 or more and 10.0 or less. When staining is performed under a ruthenium tetroxide gas atmosphere at higher pressure for a longer period of time as compared to staining of the outermost surface of the toner, the crystalline material existing in the vicinity of the surface (second surface region) of the toner can be visualized. As a method of controlling the ratio $S_2$ of the area occupied by the crystalline material, there are given a procedure for arranging a hydrophobized magnetic material having affinity for a crystalline material in the vicinity of the surface, an emulsion aggregation method including aggregating an emulsified crystalline material in multiple stages, and the like to be described later.

Further, in the toner of the present disclosure, the crystalline material forms a plurality of domains on the toner surface observed with the SEM after ruthenium-staining the toner by being treated in a ruthenium tetroxide gas atmosphere at 500 Pa for 15 minutes, and a dispersion diameter $R_2$ of the domains is 20 (nm) or more and 200 (nm) or less. Although the detail of a calculation method is described later, staining was performed under a ruthenium tetroxide gas atmosphere at high pressure for a long period of time to visualize the crystalline material existing in the vicinity of the surface (second surface region) of the toner, and the area circle-equivalent diameters of the respective domains were averaged to calculate their dispersion diameter. As a procedure for controlling the dispersion diameter $R_2$ of the domains, there are given a procedure for arranging a hydrophobized magnetic material having affinity for a crystalline material in the vicinity of the surface, an emulsion aggregation method including aggregating an emulsified crystalline material in multiple stages, and the like to be described later.

A case in which the ratio of the area occupied by the crystalline material in the first surface region and the dispersion diameter of the domains in the second surface region satisfy the above-mentioned ranges, and the ratio of the area occupied by the crystalline material in the second surface region does not satisfy the above-mentioned range is described. In this case, the amount of the crystalline material in the vicinity of the surface is small, and hence the crystalline material inside the toner surface is involved in fixing as compared to that in the vicinity of the toner surface. Thus, the crystalline material is required to exude through a long distance from the inside of the toner to the toner surface. In addition, when the amount of the crystalline material in the vicinity of the toner surface is large, the crystalline material in the vicinity of the toner surface is excessively deposited to enlarge the deformation of the toner. As a result, in any of the cases, the deformation of the toner is changed significantly with respect to the temperature and pressure at the time of fixing, and image unevenness in a medium having large irregularities has not been relieved.

Further, a case in which the ratio of the area occupied by the crystalline material and the dispersion diameter of the domains in the second surface region satisfy the above-mentioned ranges, and the ratio of the area occupied by the crystalline material in the first surface region does not satisfy the above-mentioned range is described. In this case, the amount of the crystalline material existing on the outermost surface is too large, and hence the fluidity of the toner is deteriorated to increase the uneven distribution of the toner on a medium. As a result, image unevenness in a medium having large irregularities has not been relieved.

In addition, a case in which the ratios of the areas occupied by the crystalline material in the first and second surface regions satisfy the above-mentioned ranges and the dispersion diameter of the domains in the second surface region does not satisfy the above-mentioned range is described. In this case, the uneven presence of the crystalline material in the vicinity of the toner surface is increased, and hence, at the time of fixing, a portion in which the crystalline material is excessively deposited and a portion in which the plasticization of the binder resin is insufficient occur in the vicinity of the toner surface. As a result, image unevenness in a medium having large irregularities has not been relieved.

Meanwhile, when both the ratios of the areas occupied by the crystalline material in the first and second surface regions, and the dispersion diameter of the domains satisfy the above-mentioned ranges, the crystalline material in the vicinity of the surface is not excessively deposited even in the protruding portion and the recessed portion, and the binder resin on the surface is uniformly plasticized. As a result, for the first time, image unevenness in a medium having large irregularities can be remarkably suppressed.

In addition, when the ratio of the area occupied by the crystalline material in the first surface region falls within the above-mentioned range, the fluidity is so satisfactory as to relieve the uneven distribution of the toner. The ratio is more preferably 0.0% or more and 0.3% or less.

Further, when the ratio of the area occupied by the crystalline material in the second surface region falls within the above-mentioned range, the low-temperature fixability is excellent, and excessive exudation can be suppressed. The ratio is more preferably 1.2% or more and 5.0% or less.

In addition, when the dispersion diameter of the domains in the second surface region falls within the above-mentioned range, the low-temperature fixability is excellent, and image unevenness can be suppressed. The dispersion diameter is more preferably 40 nm or more and 150 nm or less.

Further, in the toner of the present disclosure, it is preferred that the relationship between the dispersion diameter of the domains of the crystalline material existing inside the toner particle and the dispersion diameter of the domains of the crystalline material existing in the second surface region be controlled.

In the toner of the present disclosure, it is preferred that a plurality of internal domains be formed in a toner cross-section observed with a transmission electron microscope (TEM) after ruthenium-staining a thin section of the toner cut with a microtome by being treated in a ruthenium tetroxide gas atmosphere at 500 Pa for 15 minutes, and a dispersion diameter $R_1$ (nm) of the internal domains and the dispersion diameter $R_2$ (nm) of the domains in the second surface region satisfy the following expression.

$$R_i < R_2$$

When the domains of the crystalline material in the vicinity of the surface are larger than the domains of the crystalline material inside the toner, image unevenness of a halftone image in a medium having large irregularities can be suppressed. As compared to a solid image, a halftone image has a lower toner laid-on level, and heat and pressure are easily applied to the toner. Because of this, the exudation from the internal domains easily occurs. It is conceived that, when the above-mentioned expression is satisfied, excessive exudation can be suppressed even in the protruding portion, and hence image unevenness of the halftone image in a medium having large irregularities can be suppressed.

The crystalline material used for the toner of the present disclosure is not particularly limited, and a known material may be used. The crystalline material refers to a material that exhibits a clear melting point in measurement with a differential scanning calorimeter (DSC).

In the toner of the present disclosure, an ester wax, a hydrocarbon-based wax, or a crystalline polyester resin may be used as the crystalline material from the viewpoints of low-temperature fixability and releasability.

In the toner of the present disclosure, the crystalline material contains preferably a wax from the viewpoint of releasability, and contains more preferably an ester wax from the viewpoint of low-temperature fixability.

The ester wax is a wax containing a fatty acid ester as a main component. The preferred ester wax is described below. The functional number described below indicates the number of ester groups contained in one molecule. For example, behenyl behenate is referred to as "monofunctional ester wax," and dipentaerythritol hexabehenate is referred to as "hexafunctional ester wax."

As the monofunctional ester wax, a condensate of an aliphatic alcohol and an aliphatic carboxylic acid is preferred. In this case, the aliphatic carbon number is preferably from 6 to 26.

Examples of the aliphatic alcohol include 1-hexanol, 1-heptanol, 1-octanol, 1-nonanol, 1-decanol, undecyl alcohol, and lauryl alcohol. In addition, examples of the aliphatic carboxylic acid include pentanoic acid, hexanoic acid, heptanoic acid, octanoic acid, nonanoic acid, and decanoic acid.

A combination of a dicarboxylic acid and a monoalcohol, or a combination of a diol and a monocarboxylic acid may be used as a bifunctional ester wax.

Examples of the dicarboxylic acid include adipic acid, pimelic acid, suberic acid, azelaic acid, sebacic acid, and dodecanedioic acid.

Examples of the diol include 1,6-hexanediol, 1,7-heptanediol, 1,8-octanediol, 1,9-nonanediol, 1,10-decanediol, 1,11-undecanediol, and 1,12-dodecanediol.

The monoalcohol to be condensed with the dicarboxylic acid is preferably an aliphatic alcohol. Specific examples thereof include tetradecanol, pentadecanol, hexadecanol, heptadecanol, octadecanol, nonadecanol, eicosanol, docosanol, tricosanol, tetracosanol, pentacosanol, hexacosanol, and octacosanol. Of those, docosanol is preferred from the viewpoints of fixability and developability.

The monocarboxylic acid to be condensed with the diol is preferably an aliphatic carboxylic acid. Specific examples thereof include, as fatty acids, lauric acid, myristic acid, palmitic acid, margaric acid, stearic acid, tuberculostearic acid, arachidic acid, behenic acid, lignoceric acid, and cerotic acid. Of those, stearic acid and behenic acid are preferred from the viewpoints of the fixability and the developability.

Although linear fatty acids and linear alcohols have been exemplified herein, those acids and alcohols each may have a branched structure.

Now, the crystalline polyester resin is described. The crystalline polyester resin is not particularly limited, and known resins may be used. However, saturated polyester is preferred.

Further, the crystalline polyester resin is preferably a condensate of an aliphatic dicarboxylic acid and an aliphatic diol, and an aliphatic monocarboxylic acid and/or an aliphatic monoalcohol. The crystalline polyester resin is more preferably a condensate of an aliphatic dicarboxylic acid and an aliphatic diol, and an aliphatic monocarboxylic acid. The incorporation of an aliphatic monocarboxylic acid and/or an aliphatic monoalcohol as a constituent component of the crystalline polyester resin facilitates adjustment of the molecular weight and hydroxyl value of the crystalline polyester resin.

Examples of usable monomers are given below.

Examples of the aliphatic dicarboxylic acid include oxalic acid, malonic acid, succinic acid, glutaric acid, adipic acid, pimelic acid, suberic acid, azelaic acid, sebacic acid, dodecanedioic acid, hexadecanedicarboxylic acid, and octadecanedicarboxylic acid.

Examples of the aliphatic diol include ethylene glycol, diethylene glycol, triethylene glycol, 1,2-propanediol, 1,3-propanediol, dipropylene glycol, trimethylene glycol, neopentyl glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,16-hexadecanediol, and 1,18-octadecanediol.

Examples of the aliphatic monocarboxylic acid include decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), and tetracosanoic acid (lignoceric acid).

Examples of the aliphatic monoalcohol include lauryl alcohol, stearyl alcohol, and behenyl alcohol.

Through use of such a monocarboxylic acid and a monoalcohol, a crystalline polyester resin having an alkyl group (preferably having 2 or more and 24 or less carbon atoms) at a terminal can be obtained.

Herein, the monocarboxylic acid has only one carboxylic acid, and hence the structure derived from the monocarboxylic acid is located at the terminal of a molecular chain of the crystalline polyester resin.

A weight-average molecular weight Mw of the crystalline polyester resin is preferably 5,000 or more and 60,000 or less.

The crystalline polyester resin may be produced by an ordinary polyester synthesis method. For example, the crystalline polyester resin may be obtained by subjecting a dicarboxylic acid component and a diol component to an esterification reaction or a transesterification reaction, followed by a polycondensation reaction under reduced pressure or under introduction of a nitrogen gas in accordance with a conventional method.

The hydrocarbon-based wax is an aliphatic hydrocarbon-based wax, and there are given, for example, low-molecular weight polyethylene, low-molecular weight polypropylene, a microcrystalline wax, a Fischer-Tropsch wax, a paraffin wax, a polyolefin wax, and the like.

In the toner of the present disclosure, the above-mentioned two kinds of materials may be used in combination as the crystalline materials. Hereinafter, respective materials are sometimes referred to as "first crystalline material" and "second crystalline material."

The content of the crystalline material is preferably 2 parts by mass or more and 30 parts by mass or less, more preferably 4 parts by mass or more and 25 parts by mass or less, still more preferably 10 parts by mass or more and 20 parts by mass or less with respect to 100 parts by mass of the binder resin.

The melting point of the crystalline material is preferably 60° C. or more and 90° C. or less, more preferably 65° C. or more and 80° C. or less.

A colorant to be used in the toner of the present disclosure is described below.

In the present disclosure, it is preferred that the colorant be hydrophobic-treated with a silane coupling agent. When the colorant is hydrophobic-treated with a silane coupling agent, the dispersibility of the colorant in the toner is improved, and the hydrophobized colorant has high affinity for the crystalline material. Because of this, the dispersion diameters of the domains in the second surface region of the toner and inside the toner are easily controlled to the preferred ranges. The silane coupling agent to be used for the silane coupling treatment is represented by the following formula.

$$R—SiX_nY_m$$

In the formula, X and Y each represent an alkoxy group, "n" and "m" each represent an integer of 0 or more and 3 or less, and n+m=3, and R represents a functional group, such as an alkyl group, a phenyl group, a vinyl group, an epoxy group, or a (meth) acrylic group.

Examples of the silane coupling agent represented by the above-mentioned formula may include vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-propyltrimethoxysilane, isopropyltrimethoxysilane, n-butyltrimethoxysilane, isobutyltrimethoxysilane, trimethylmethoxysilane, n-hexyltrimethoxysilane, n-octyltrimethoxysilane, n-octyltriethoxysilane, n-decyltrimethoxysilane, hydroxypropyltrimethoxysilane, n-hexadecyltrimethoxysilane, and n-octadecyltrimethoxysilane. In the present invention, silane coupling agents in each of which R in the above-mentioned formula is an alkyl group may be preferably used. Of those, a silane coupling agent having an alkyl group having 3 or more and 6 or less carbon atoms is preferred, and a silane coupling agent having an alkyl group having 3 or 4 carbon atoms is particularly preferred.

When the above-mentioned silane coupling agents are used, the treatment can be performed through use of one silane coupling agent or a combination of a plurality of kinds thereof. When the plurality of kinds are used in combination, the treatment may be performed individually with each of the coupling agents or may be performed at the same time with the plurality of kinds.

As the colorant, there are given the following organic pigments, organic dyes, and inorganic pigments.

As a cyan colorant, there are given copper phthalocyanine compounds and derivatives thereof, anthraquinone compounds, and basic dye lake compounds.

As a magenta colorant, there are given the following: condensed azo compounds, diketopyrrolopyrrole compounds, anthraquinone, quinacridone compounds, basic dye lake compounds, naphthol compounds, benzimidazolone compounds, thioindigo compounds, and perylene compounds. As a yellow colorant, there are given condensed azo compounds, isoindolinone compounds, anthraquinone compounds, azo metal complexes, methine compounds, and allylamide compounds.

As a black colorant, there are given carbon black and those colored in black through use of the above-mentioned yellow colorant, magenta colorant, cyan colorant, and magnetic powder.

In the present disclosure, it is preferred that the colorant be a hydrophobized magnetic material. When the colorant is a hydrophobized magnetic material, the hydrophobized magnetic material is likely to exist in the vicinity of the surface of the toner in a suspension polymerization method, which is a production method suitable for the present disclosure. Because of this, in the suspension polymerization method, the ratio of the area occupied by the crystalline material in the second surface region is easily controlled.

In the present disclosure, it is preferred that a peak intensity ratio [Si—O—Si]/[Si—C] of ATR-IR of a component extracted from the hydrophobized magnetic material with toluene be 1.4 to 2.5. The peak intensity ratio of ATR-IR influences an unreacted treatment agent and a low-molecular weight treatment agent condensate contained in the hydrophobized magnetic material. In addition, the unreacted treatment agent and the treatment agent condensate have high affinity for the crystalline material and water, and serve as crystal nuclei of the crystalline material. When the peak intensity ratio falls within the above-mentioned range, the amounts of the unreacted treatment agent and the treatment agent condensate are small, and hence the release thereof to the toner surface is suppressed. Because of this, the ratio of the area occupied by the crystalline material in the first surface region is easily controlled to the preferred range.

In the present disclosure, it is preferred that the surface vicinity existence index of the hydrophobized magnetic material obtained by observing the toner with the SEM be 4.0 to 8.0 pieces/1 $\mu m^2$. The surface vicinity existence index of the magnetic material refers to the number of pieces of the magnetic material existing in the vicinity of the surface of the toner particle, that is, the number of pieces per 1 $\mu m^2$ of a surface area.

The index falling within a range of 4.0 to 8.0 pieces/1 $\mu m^2$ means that the magnetic material is unevenly distributed in the vicinity of the surface of the toner particle. As a result, deformation of the toner is suppressed even in the protruding portion of a medium, and hence image unevenness in a medium having larger irregularities (lower smoothness) can be suppressed.

The index can be controlled by the dispersion strength in a dispersion step of the magnetic material. When the dispersion strength is increased, the magnetic material is shredded and can be dispersed as primary particles in the toner.

In addition, in order to increase the index, a procedure for increasing the number of parts of the magnetic material may be combined.

The addition amount of the magnetic material is preferably 40 parts by mass or more and 200 parts by mass or less, more preferably 60 parts by mass or more and 120 parts by mass or less with respect to 100 parts by mass of the binder resin.

In the present disclosure, the hydrophobizing degree of the hydrophobized magnetic material is preferably 55 to 80. When the hydrophobizing degree falls within the above-mentioned range, the hydrophobized magnetic material is likely to exist in a dispersed state in the vicinity of the toner surface in the suspension polymerization method, which is a production method suitable for the present disclosure. Because of this, in the suspension polymerization method, the ratio of the area occupied by the crystalline material in the second surface region and the dispersion diameter of the domains are easily controlled to the preferred ranges.

In the present disclosure, it is preferred that a value (mass change ratio/specific surface area), which is obtained by dividing a mass change ratio of the hydrophobized magnetic material when the hydrophobized magnetic material is left to stand under an environment of a temperature of 30° C. and a relative humidity of 0% for 24 hours and then left to stand under an environment of a temperature of 30° C. and a relative humidity of 80% for 1 hour by a specific surface area of the hydrophobized magnetic material, be 0.002 to 0.020%·g/m2. When the ratio "mass change ratio/specific surface area" falls within the above-mentioned range, the affinity for the ester wax preferred in the present disclosure is improved. Because of this, the dispersion diameters of the domains in the second surface region of the toner and inside the toner are easily controlled to the preferred ranges.

In the present disclosure, it is preferred that, in the hydrophobized magnetic material, a spectrum of Si obtained based on a total electron yield (TEY) method using a near-edge X-ray absorption fine structure (NEXAFS) have a peak Ain a range of 1,844.4 to 1,844.8 eV and a peak B in a range of 1,846.1 to 1,846.6 eV, and when an area of the peak A is represented by $I_A$, an area of the peak B is represented by $I_B$, and the number of moles of Si derived from a silane compound contained in 1 g of the hydrophobized magnetic material is represented by $M_{Si}$, $I_A/(I_A+I_B)/M_{Si}$ be 40 to 55.

According to the NEXAFS, information on the state of the silane compound bonded to an Fe atom in the magnetic material can be obtained. Then, it can be determined that, when the peak A in the absorption spectrum of Si is larger, the amount of the silane compound bonded to the surface of the magnetic material is smaller. Conversely, it can be determined that, when the peak B is larger, the amount of the silane compound bonded to the surface of the magnetic material is larger.

The degree of bonding between the silane compound and the surface of the magnetic material is important. When the ratio of the silane compound chemically bonded to the surface of the magnetic material is smaller, the molecules of the silane coupling agent are condensed with each other at a higher degree, and the silane compound on the surface of the magnetic material becomes bulky. When the silane coupling compound is bulky, the affinity for the crystalline material becomes higher to attract the crystalline material and accelerate the growth of the domains. As a result, the ratio of the area occupied by the crystalline material in the second surface region and the dispersion diameter of the domains are easily controlled to the preferred ranges.

In the expression, $I_A$ represents the area of the peak A, $I_B$ represents the area of the peak B, and $M_{Si}$ represents the number of moles of Si derived from the silane compound contained in 1 g of the hydrophobized magnetic material.

Specifically, it is important that a value obtained by dividing the intensity of the peak A indicating the bonding between the molecules of the silane coupling agent by the sum of the peak A and the peak B, and the number of moles of Si derived from the silane compound subjected to surface treatment fall within the above-mentioned range. When the value of the above-mentioned expression is more than 55, the bonding between the silane compound and the magnetic material in a bonded state is weakened, and hence a hydrophilic magnetic material is exposed, with the result that the function of the silane compound cannot be effectively exhibited. Meanwhile, when the value of the above-mentioned expression is less than 40, the surface of the magnetic material and the silane compound are bonded, but the silane compound does not have a bulky structure, with the result that the function cannot be effectively exhibited. From the above-mentioned viewpoints, the value of the above-mentioned expression falls within a range of preferably 40 to 55, more preferably 43 to 48. The reason for dividing the value of $I_A/(I_A+I_B)$ by the value of $M_{Si}$ lies in standardization.

A high value of $I_A/(I_A+I_B)/M_{Si}$ (hereinafter sometimes referred to as "NEXAFS value") indicates that, in the hydrophobizing agent, the condensed amount between the molecules of the treatment agent is larger relative to that of the treatment agent bonded to the magnetic material. A compound in which a hydrophobizing agent is subjected to polycondensation has very high hydrophobicity, and hence the affinity for the crystalline material is easily improved. Because of this, a large amount of the crystalline material is likely to exist in the vicinity of the magnetic material. As a result, the hydrophobized magnetic material is likely to exist in the vicinity of the surface of the toner in the suspension polymerization method, which is a production method suitable for the present invention. Accordingly, in the suspension polymerization method, the amount of the crystalline material existing in the vicinity of the toner surface is easily controlled.

The magnetic material according to the present disclosure contains magnetic iron oxide, such as triiron tetraoxide or γ-iron oxide, as a main component, and may contain elements, such as phosphorus, cobalt, nickel, copper, magnesium, manganese, aluminum, and silicon. Those magnetic materials each have a BET specific surface area by a nitrogen adsorption method of preferably from 2 $m^2/g$ to 30 $m^2/g$, more preferably from 3 $m^2/g$ to 28 $m^2/g$. In addition, those each having a Mohs hardness of from 5 to 7 are preferred. Examples of the shape of the magnetic material include a polyhedron, an octahedron, a hexahedron, a spherical shape, a needle shape, and a scale shape, and those each having less anisotropy, such as a polyhedron, an octahedron, a hexahedron, and a spherical shape, are preferred from the viewpoint of increasing an image density.

It is preferred that the magnetic material have a number-average primary particle diameter of 0.10 μm or more and 0.40 μm or less. In general, when the particle diameter of the magnetic material is smaller, the coloring power of the toner is increased. However, the magnetic material is liable to be aggregated, and the uniform dispersibility of the magnetic powder in the toner becomes inferior. Accordingly, it is not preferred that the particle diameter be smaller. In addition, when the number-average primary particle diameter is less than 0.10 μm, the magnetic material itself becomes reddish black, and the reddish color is conspicuous especially in a halftone image. It cannot be said that the image has high quality. Accordingly, it is not preferred that the number-average primary particle diameter be less than 0.10 μm. Meanwhile, when the number-average primary particle diameter is more than 0.40 μm, the coloring power of the toner is insufficient, and in the suspension polymerization method (described later), which is a toner production method suitable for the present disclosure, uniform dispersion becomes difficult. Accordingly, it is not preferred that the number-average primary particle diameter be more than 0.40 μm.

The number-average primary particle diameter of the magnetic material may be measured through use of a transmission electron microscope (TEM). Specifically, the toner particles to be observed are sufficiently dispersed in an epoxy resin, and then the resultant is cured in an atmosphere of a temperature of 40° C. for 2 days to obtain a cured product. The cured product thus obtained is formed into a thin sample with a microtome, and particle diameters of 100 magnetic powder particles in the field of view of a photograph are measured with the transmission electron microscope (TEM) at a magnification of from 10,000 times to 40,000 times. Then, the number-average primary particle diameter is calculated based on a circle-equivalent diameter equal to a projected area of the magnetic material. In addition, the number-average primary particle diameter may also be measured with an image analyzer.

The magnetic material used in the toner of the present disclosure may be produced, for example, by the following method. An alkali, such as sodium hydroxide, is added to a ferrous salt aqueous solution in an equivalent amount or more with respect to an iron component, to thereby prepare an aqueous solution containing ferrous hydroxide. Air is blown into the prepared aqueous solution while the pH of the solution is maintained at a pH of 7 or more, and while the aqueous solution is warmed to 70° C. or more, the ferrous hydroxide is oxidized to first generate seed crystals serving as the core of the magnetic material.

Next, an aqueous solution containing about 1 equivalent of ferrous sulfate is added to a slurry-like liquid containing the seed crystals based on the addition amount of the alkali added in advance. Under the condition that the pH of the liquid is maintained at from 5 to 10, the reaction of ferrous hydroxide is allowed to proceed while air is blown into the liquid. Thus, the magnetic material was grown with the seed crystals as a core. In this case, the shape and magnetic characteristics of the magnetic material can be controlled by selecting an arbitrary pH, reaction temperature, and stirring conditions. As the oxidation reaction is allowed to proceed, the pH of the liquid is shifted to the acidic side, but it is preferred that the pH of the liquid not be less than 5. The magnetic material thus obtained is filtered, washed, and dried by a conventional method. Thus, a magnetic material can be obtained.

Homopolymers of styrene and substituted products thereof, such as polystyrene and polyvinyltoluene, styrene-based copolymers, such as a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleic acid ester copolymer, and polymethyl methacrylate, polybutyl methacrylate, polyvinyl acetate, polyethylene, polypropylene, polyvinylbutyral, a silicone resin, a polyester resin, a polyamide resin, an epoxy resin, and a polyacrylic resin may each be used as the binder resin to be used in the toner of the present disclosure. Those binder resins may be used alone or in combination thereof. Of those, styrene acrylic resins typified by a styrene-butyl acrylate copolymer are particularly preferred from the viewpoints of, for example, development characteristics and the fixability.

The toner of the present invention may use a charge control agent in order to keep the chargeability of the toner stable irrespective of an environment.

As a negatively chargeable charge control agent, there are given the following: monoazo metal compounds, acetylacetone metal compounds, aromatic oxycarboxylic acids, aromatic dicarboxylic acids, metal compounds based on oxycarboxylic acids and dicarboxylic acids, aromatic oxycarboxylic acids, aromatic monocarboxylic and polycarboxylic acids, and metal salts, anhydrates, and esters thereof, phenol derivatives, such as bisphenol, urea derivatives, metal-containing salicylic acid-based compounds, metal-containing naphthoic acid-based compounds, boron compounds, quaternary ammonium salts, calixarenes, and resin-based charge control agents.

As a positively chargeable charge control agent, there are given the following: nigrosine modified products based on, for example, nigrosine and a fatty acid metal salt; guanidine compounds; imidazole compounds; quaternary ammonium salts, such as tributylbenzylammonium-1-hydroxy-4-naphtosulfonate and tetrabutylammonium tetrafluoroborate, and onium salts, such as phosphonium salts, which are analogs thereof, and lake pigments thereof, triphenylmethane dyes and lake pigments thereof (e.g., as laking agents, phosphotungstic acid, phosphomolybdic acid, phosphotungstomolybdic acid, tannic acid, lauric acid, gallic acid, a ferricyanide, and a ferrocyanide); higher fatty acid metal salts; diorganotin oxides, such as dibutyltin oxide, dioctyltin oxide, and dicyclohexyltin oxide; diorganotin borates, such as dibutyltin borate, dioctyltin borate, and dicyclohexyltin borate; and a resin-based charge control agent.

Those charge control agents may be used alone or in combination thereof.

Of those, as the charge control agent except the resin-based charge control agent, a metal-containing salicylic acid-based compound is preferred, and in particular, the metal-containing salicylic acid-based compound containing aluminum or zirconium as a metal is preferred. A particularly preferred control agent is an aluminum salicylate compound.

A polymer or a copolymer having a sulfonic acid group, a sulfonic acid base or a sulfonic acid ester group, a salicylic acid moiety, or a benzoic acid moiety is preferably used as the resin-based charge control agent.

The blending amount of the charge control agent is preferably from 0.01 part by mass to 20.0 parts by mass, more preferably from 0.05 part by mass to 10.0 parts by mass with respect to 10.0 parts by mass of the polymerizable monomer.

(Method of Producing Toner)

The toner of the present disclosure may be produced by any known method. First, when the toner is produced by a pulverization method, for example, a binder resin, a colorant, a wax, and as required, components required for the toner, such as a charge control agent, other additives, and the like are sufficiently mixed with a mixer, such as a Henschel mixer or a ball mill. Then, the mixture is melt-kneaded through use of a heat kneader, such as a heating roll, a kneader, or an extruder, to disperse or dissolve the toner materials, and the resultant is solidified by cooling, pulverized, and then classified, and as required, surface-treated. Thus, toner particles can be obtained. Any one of the classification and the surface treatment may come first. In the classification step, it is preferred to use a multi-division classifier from the viewpoint of production efficiency.

The pulverization step may be performed by a method using a known pulverizing apparatus, such as a mechanical impact type pulverizing apparatus or a jet type pulverizing apparatus, in order to control the existence state of the crystalline material of the present invention. In addition, it is preferred to further apply heat to pulverize the mixture or to perform a process of applying an auxiliary mechanical impact. In addition, a hot water bath method involving dispersing finely pulverized (classified if required) toner particles in hot water, a method involving allowing the toner particles to pass through a hot air stream, or the like may be used.

As a method of applying a mechanical impact force, for example, there is given a method using a mechanical impact type pulverizer, such as Cryptron System manufactured by Kawasaki Heavy Industries, Ltd. or Turbo Mill manufactured by Freund-Turbo Corporation. In addition, apparatus, such as Mechanofusion System manufactured by Hosokawa Micron Corporation and Hybridization System manufactured by Nara Machinery Co., Ltd., may also be used. In the process of producing toner particles, those apparatus each press an object to be pulverized on an inner side of a casing by a centrifugal force with blades, which rotate at high speed, and apply mechanical impact forces, such as a compressive force and a frictional force, to pulverize the material.

When the toner of the present disclosure is produced by the pulverization method, the toner may also be modified into toner particles each having a core shell structure.

The toner of the present disclosure may also be produced by the pulverization method as described above, but the toner of the present invention has a configuration in which a certain amount of the crystalline material exists in the vicinity of the toner surface, and the crystalline material hardly exists on the outermost surface of the toner. Accordingly, it is preferred that the toner be produced in an aqueous medium.

In the case where the toner is produced by an emulsion aggregation method, when the crystalline material is aggregated so as to be exposed on the surface of the toner, and then an amorphous resin having a large SP value difference from the crystalline material is used, there is a problem in that the formation of a shell is liable to be inhibited. In order to solve this problem, a small amount of the amorphous resin having a relatively small SP value difference from the crystalline material is aggregated on the surface of the toner, and then another amorphous resin having a relatively large SP value difference is used to form the shell. Thus, the toner of the present invention can be obtained.

Now, the suspension polymerization method is described.

The suspension polymerization method is a method involving uniformly dissolving or dispersing a polymerizable monomer and a colorant (further, as required, a polymerization initiator, a cross-linking agent, a charge control agent, and other additives) to obtain a polymerizable monomer composition, then dispersing the polymerizable monomer composition in a continuous layer (for example, an aqueous phase) containing a dispersant through use of an appropriate stirring machine, and simultaneously allowing a polymerization reaction to proceed, to thereby obtain a toner having a desired particle diameter. The toner obtained by the suspension polymerization method (hereinafter sometimes referred to as "polymerized toner") contain toner particles each having a substantially spherical shape, and hence the distribution of the amount of charge is relatively uniform. Accordingly, an improvement in image quality can be expected.

In the production of the polymerized toner according to the present disclosure, as the polymerizable monomer for forming the polymerizable monomer composition, there are given the following.

Examples of the polymerizable monomer include: styrene-based monomers, such as styrene, o-methylstyrene, m-methylstyrene, p-methylstyrene, p-methoxystyrene, and p-ethylstyrene; acrylic acid esters, such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate, and phenyl acrylate; methacrylic acid esters, such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; and other monomers, such as acrylonitrile, methacrylonitrile, and acrylamide. Those monomers may be used alone or as a mixture thereof. Of the above-mentioned monomers, styrene is preferably used alone or as a mixture with any other monomer from the viewpoints of the development characteristics and durability of the toner.

As the polymerization initiator used in the production of the toner of the present disclosure by the polymerization method, an initiator having a half-life at the time of the polymerization reaction of 0.5 hour or more and 30 hours or less is preferred. In addition, when the polymerization reaction is performed through use of the polymerization initiator in an addition amount of 0.5 part by mass or more and 20 parts by mass or less with respect to 100 parts by mass of the polymerizable monomer, a polymer having a local maximum in a molecular weight range of 5,000 or more and 50,000 or less is obtained, and desired strength and suitable melting characteristics can be imparted to the toner.

Specific examples of the polymerization initiator include: azo-based or diazo-based polymerization initiators, such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide-based polymerization initiators, such as benzoyl peroxide, methyl ethyl ketone peroxide, diisopropyl peroxycarbonate, cumene hydroperoxide, 2,4-dichlorobenzoyl peroxide, lauroyl peroxide, t-butyl peroxy 2-ethylhexanoate, and t-butyl peroxypivalate.

When the toner of the present disclosure is produced by the polymerization method, a cross-linking agent may be added, and a preferred addition amount thereof is 0.001 part by mass or more and 15 parts by mass or less with respect to 100 parts by mass of the polymerizable monomer.

Herein, a compound having two or more polymerizable double bonds is mainly used as the cross-linking agent, and for example, aromatic divinyl compounds, such as divinylbenzene and divinylnaphthalene, for example, carboxylic acid esters each having two double bonds, such as ethylene glycol diacrylate, ethylene glycol dimethacrylate, and 1,3-butanediol dimethacrylate, divinyl compounds, such as divinylaniline, divinyl ether, divinyl sulfide, and divinyl sulfone, and compounds each having three or more vinyl groups are used alone or as a mixture thereof.

In the method of producing the toner of the present disclosure by the polymerization method, in general, a polymerizable monomer composition, which is obtained by appropriately adding the above-mentioned polymerizable monomer, colorant, and the like, and uniformly dissolving or dispersing the materials with a disperser, such as a homogenizer, a ball mill, or an ultrasonic disperser, is suspended in an aqueous medium containing a dispersant. In this case, when a high-speed disperser, such as a high-speed stirring machine or an ultrasonic disperser, is used to set each of toner particles to a desired toner particle size at once, the particle diameter of each of the toner particles to be obtained becomes sharper. Regarding the timing at which the polymerization initiator is added, the polymerization initiator may be added simultaneously when the other additives are added to the polymerizable monomer, or may be mixed immediately before the suspension in the aqueous medium. In addition, the polymerizable monomer or the polymerization initiator dissolved in a solvent may also be added immediately after granulation and before the start of the polymerization reaction.

After the granulation, stirring may be performed through use of an ordinary stirring machine to the extent that the states of the particles are maintained, and the floating and sedimentation of the particles are prevented.

When the toner of the present invention is produced, a known surfactant, an organic dispersant, or an inorganic dispersant may be used as the dispersant. Of those, the inorganic dispersant does not easily generate harmful ultrafine powder. The inorganic dispersant has dispersion stability because of the steric hindrance thereof, and hence the stability is not easily lost even when a reaction temperature is changed. The inorganic dispersant is easily washed off and hardly has an adverse effect on the toner. Accordingly, the inorganic dispersant may be preferably used. Examples of such inorganic dispersant include: phosphoric acid polyvalent metal salts, such as tricalcium phosphate, magnesium phosphate, aluminum phosphate, zinc phosphate, and hydroxyapatite; carbonates, such as calcium carbonate and magnesium carbonate; inorganic salts, such as calcium metasilicate, calcium sulfate, and barium sulfate; and inorganic compounds, such as calcium hydroxide, magnesium hydroxide, and aluminum hydroxide.

It is desired that those inorganic dispersants be each used in an amount in a range of 0.2 part by mass or more and 20 parts by mass or less with respect to 100 parts by mass of the polymerizable monomer. In addition, the inorganic dispersants may be used alone or in combination thereof. Further, a surfactant may be used in combination in an amount in a range of 0.001 part by mass or more and 0.1 part by mass or less.

When those inorganic dispersants are used, the inorganic dispersants may be used as they are, but in order to obtain finer particles, the inorganic dispersant particles generated in an aqueous medium may be used. For example, in the case of tricalcium phosphate, water-insoluble calcium phosphate can be generated by mixing an aqueous solution of sodium phosphate and an aqueous solution of calcium chloride under high-speed stirring, thereby enabling more uniform and finer dispersion. In this case, a water-soluble sodium chloride salt is simultaneously produced as a by-product. It is more convenient that a water-soluble salt be present in the aqueous medium because the dissolution of the polymerizable monomer in water is suppressed, and hence an ultrafine toner is not easily generated by emulsion polymerization.

Examples of the surfactant include sodium dodecylbenzene sulfate, sodium tetradecyl sulfate, sodium pentadecyl sulfate, sodium octyl sulfate, sodium oleate, sodium laurate, sodium stearate, and potassium stearate.

In the step of polymerizing the above-mentioned polymerizable monomer, a polymerization temperature is set to a temperature of 40° C. or more, generally 50° C. or more and 90° C. or less.

Toner particles are obtained by filtering, washing, and drying the polymer particles thus obtained by a known method. Inorganic fine powder as described later is mixed, as required, with the toner particles to be caused to adhere to the surface of each of the toner particles. Thus, the toner of the present invention can be obtained. In addition, a classification step may be inserted in the production process (before the mixing of the inorganic fine powder) to discard coarse powder and fine powder contained in the toner particles.

The toner of the present disclosure is prepared as a toner by mixing additives, such as a fluidizing agent, as required, with the toner particles obtained by the production method as described above. As for the mixing method, a known method may be used, and for example, a Henschel mixer is an apparatus that may be suitably used.

In the toner of the present disclosure, it is preferred that inorganic fine powder having a number-average primary particle diameter of from 4 nm to 80 nm, more preferably from 6 nm to 40 nm be added to the toner particles as a fluidizing agent. The inorganic fine powder is added in order to improve the fluidity of the toner and homogenize the charge of the toner particles, and it is also preferred that the inorganic fine powder be subjected to treatment, such as hydrophobic treatment, so that functions, such as the adjustment of the charge amount of the toner and an improvement in environmental stability thereof, may be imparted thereto.

A method of measuring the number-average primary particle diameter of the inorganic fine powder is performed through use of a photograph of the toner taken so as to be enlarged with a scanning electron microscope.

Silica, titanium oxide, alumina, or the like may be used as the inorganic fine powder used in the present disclosure. For example, both so-called dry method silica generated by vapor phase oxidation of a silicon halide or dry silica called fumed silica, and so-called wet silica produced from water glass or the like may each be used as the silica fine powder. However, the dry silica having less silanol groups on the surface and inside the silica fine powder, and less production residues, such as $Na_2O$ and $SO_3^{2-}$, is preferred. In addition, in the dry silica, composite fine powder of silica and any other metal oxide may also be obtained, for example, by using any other metal halogen compound, such as aluminum chloride or titanium chloride, together with a silicon halogen compound in the production process, and the inorganic fine powder also encompasses the composite fine powder.

The addition amount of the inorganic fine powder having a number-average primary particle diameter of 4 nm or more and 80 nm or less is preferably 0.1 mass % or more and 3.0 mass % or less with respect to the toner particles. When the addition amount is less than 0.1 mass %, the effect of the inorganic fine powder is not sufficient. When the addition amount is more than 3.0 mass %, the fixability of the toner is deteriorated. The content of the inorganic fine powder may be determined through use a calibration curve created from a standard sample through use of fluorescent X-ray analysis.

In the present disclosure, it is preferred that the inorganic fine powder be a hydrophobized substance because the environmental stability of the toner can be improved. When the inorganic fine powder added to the toner absorbs moisture, the charge amount of the toner particles is remarkably reduced and is liable to be non-uniform, with the result that the toner is liable to scatter. Treatment agents, such as silicone varnish, various modified silicone varnishes, silicone oil, various modified silicone oils, a silane compound, a silane coupling agent, other organic silicon compounds, and organic titanium compounds, may be used alone or in combination thereof as the treatment agent to be used for hydrophobic treatment of the inorganic fine powder.

In the toner of the present disclosure, as long as a substantial adverse effect is not given to the toner, other additives, for example, lubricant powder, such as fluororesin powder, zinc stearate powder, or polyvinylidene fluoride powder, a polishing agent, such as cerium oxide powder, silicon carbide powder, or strontium titanate powder, a fluidity imparting agent, such as titanium oxide powder or aluminum oxide powder, an anti-caking agent, or organic fine particles and inorganic fine particles opposite in polarity to each other may further be used in small amounts as a developability improver. Those additives may be used after their surfaces are hydrophobic-treated.

The weight-average particle diameter (D4) of the toner produced by the present disclosure is preferably 3.0 μm or more and 12.0 μm or less, more preferably 4.0 m or more and 10.0 μm or less. When the weight-average particle diameter (D4) is 3.0 m or more and 12.0 μm or less, satisfactory fluidity is obtained, and a latent image can be faithfully developed.

Next, a method of measuring each physical property is described.

<Method of Measuring Hydrophobizing Degree>

Regarding the hydrophobizing degree, a powder wettability tester WET-100P manufactured by Rhesca Co., Ltd. is used, and a methanol dropping transmittance curve measured under the following conditions and procedure is utilized.

First, 50 ml of a methanol/water mixed solvent (methanol concentration: 0%) is loaded into a flask, and its transmittance is measured. Transmittance measurement is performed under the condition that the transmittance at this time is set to 100% and the transmittance in a state in which the mixed solvent transmits no light is set to 0%. Specifically, the mass % of methanol when a transmitted light intensity at the time of the measurement becomes half of a transmitted light intensity when light is passed through the methanol/water mixed solvent (methanol concentration: 0%) is defined as the hydrophobizing degree of the present invention.

The transmittance is measured as described below.

A magnetic stirrer is placed in a beaker containing 50 ml of a methanol/water mixed solvent (methanol concentration: 0%). Then, 0.1 g of iron oxide particles sifted with a mesh having a mesh size of 100 μm are precisely weighed and loaded into the above-mentioned flask. Next, stirring is started with the magnetic stirrer at a stirring speed of 300 rpm (5 rotations/sec), and methanol is continuously added to the sample liquid for measurement at an addition rate of 1.3 ml/min with a glass tube. The transmittance of the liquid for light having a wavelength of 780 nm is measured, and a methanol dropping transmittance curve is created. In this case, methanol is used as a titration solvent because the effect of elution of the hydrophobizing agent to be used for surface treatment of the iron oxide particles is small, and hence the surface properties of the iron oxide particles can be evaluated more accurately.

In this measurement, a beaker made of glass having a diameter of 5 cm was used as the beaker, and a magnetic stirrer having a spindle shape with a length of 25 mm and a maximum diameter of 8 mm, and having a Teflon (trademark) coating applied thereto was used as the magnetic stirrer.

<Measurement of Weight-Average Particle Diameter (D4) of Toner (Particles)>

The weight-average particle diameter (D4) of the toner (particles) is measured with the number of effective measurement channels of 25,000 by using a precision particle size distribution-measuring apparatus based on a pore electrical resistance method including a 100-micrometer aperture tube “Coulter Counter Multisizer 3” (trademark, manufactured by Beckman Coulter, Inc.) and dedicated software included therewith “Beckman Coulter Multisizer 3 Version 3.51” (manufactured by Beckman Coulter, Inc.) for setting measurement conditions and analyzing measurement data. Then, the measurement data is analyzed to calculate the diameter.

An electrolyte aqueous solution prepared by dissolving guaranteed sodium chloride in ion-exchanged water so as to have a concentration of about 1 mass %, such as “ISOTON II” (manufactured by Beckman Coulter, Inc.), may be used in the measurement.

The dedicated software is set as described below prior to the measurement and the analysis.

In the “change standard measurement method (SOM)” screen of the dedicated software, the total count number of a control mode is set to 50,000 particles, the number of times of measurement is set to 1, and a value obtained by using “standard particles each having a particle diameter of 10.0 μm” (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 m or more and 60 μm or less.

A specific measurement method is as described below.

(1) About 200 ml of the electrolyte aqueous solution is charged into a 250-milliliter round-bottom beaker made of glass dedicated for the Multisizer 3. The beaker is set in a sample stand, and the electrolyte aqueous solution is stirred with a stirrer rod at 24 rotations/sec in a counterclockwise direction. Then, dirt and bubbles in the aperture tube are removed by the "aperture flush" function of the dedicated software.

(2) About 30 ml of the electrolyte aqueous solution is charged into a 100-milliliter flat-bottom beaker made of glass. About 0.3 ml of a diluted solution prepared by diluting "Contaminon N" (a 10 mass % aqueous solution of a neutral detergent for washing a precision measuring device formed of a nonionic surfactant, an anionic surfactant, and an organic builder and having a pH of 7, manufactured by Wako Pure Chemical Industries, Ltd.) with ion-exchanged water by three mass fold is added as a dispersant to the electrolyte aqueous solution.

(3) A predetermined amount of ion-exchanged water is charged into the water tank of an ultrasonic dispersing unit "Ultrasonic Dispersion System Tetora 150" (manufactured by Nikkaki Bios Co., Ltd.) having an electrical output of 120 W in which two oscillators each having an oscillatory frequency of 50 kHz are built so as to be out of phase by 180°. About 2 ml of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted in order that the liquid level of the electrolyte aqueous solution in the beaker may resonate with an ultrasonic wave from the ultrasonic dispersing unit to the fullest extent possible.

(5) About 10 mg of toner (particles) are gradually added to and dispersed in the electrolyte aqueous solution in the beaker in the section (4) under a state in which the electrolyte aqueous solution is irradiated with the ultrasonic wave. Then, the ultrasonic dispersion treatment is further continued for 60 seconds. The temperature of water in the water tank is appropriately adjusted to 10° C. or more and 40° C. or less in the ultrasonic dispersion.

(6) The electrolyte aqueous solution in the section (5) having dispersed therein the toner (particles) is dropped with a pipette to the round-bottom beaker in the section (1) placed in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the weight-average particle diameter (D4) is calculated. An "average diameter" on the "analysis/volume statistics (arithmetic average)" screen of the dedicated software when the dedicated software is set to show a graph in a vol % unit is the weight-average particle diameter (D4).

<Method of measuring Number-average Particle Diameter of Magnetic Material>

A magnetic material to be observed is sufficiently dispersed in an epoxy resin, and is then cured in an atmosphere of a temperature of 40° C. for 2 days to obtain a cured product. The cured product thus obtained is formed into a thin sample with a microtome, and a sectional image is taken at a magnification of 40,000 times through use of a transmission electron microscope (TEM). The particle diameters of 100 pieces of the magnetic material in the sectional image are measured. Then, the number-average particle diameter of the magnetic material is calculated based on an area circle-equivalent diameter of the magnetic material.

<Method of Calculating Ratio of Area Occupied by Crystalline Material in First Surface Region of Toner>

A vacuum electron staining apparatus (Filgen, Inc., VSC4R1H) is used for calculating a ratio $S_1$ (%) of an area occupied by a crystalline material per area of a toner surface on the outermost surface (first surface region) of the toner. The calculation is performed through use of an image obtained by observing a reflected electron image of the toner, which has been stained in a $RuO_4$ gas atmosphere at 100 Pa for 5 minutes, with a field emission scanning electron microscope (sometimes referred to as "scanning electron microscope" or "SEM") S-4800 (Hitachi High-Technologies Corporation). Liquid nitrogen is injected into an anticontamination trap mounted on the casing of the S-4800 until the liquid nitrogen flows out, followed by standing for 30 minutes. The "PC-SEM" of the S-4800 is activated to perform flushing (the cleaning of a FE chip that is an electron source). The acceleration voltage-displaying portion of a control panel on the screen of the S-4800 is clicked, and the [Flushing] button thereof is pressed to open a flushing performance dialog. The fact that a flushing intensity is 2 is recognized, and the flushing is performed. The fact that an emission current caused by the flushing is from 20 μA to 40 μA is recognized. A sample holder is inserted into the sample chamber of the casing of the S-4800. An [Origin] button on the control panel is pressed to move the sample holder to an observation position.

The acceleration voltage-displaying portion is clicked to open an HV setting dialog, followed by the setting of an acceleration voltage to [5.0 kV] and an emission current to [20 μA]. In a [Basic] tab of an operation panel, a signal selection mode is set to [SE]. [Up (U)] and [+BSE] are selected in a SE detector, and [L. A. 100] is selected in a selection box on the right side of the [+BSE] to set a mode for observing with a reflected electron image. Similarly, in the [Basic] tab of the operation panel, a probe current of an electro-optical system condition block is set to [Normal], a focus mode is set to [UHR], and WD is to [3.0 mm]. An [ON] button in the acceleration voltage-displaying portion of the control panel is pressed to apply an acceleration voltage. The domains of the crystalline material observed in black under the above-mentioned observation conditions are brought into focus, and a SEM image is stored.

Regarding the image thus obtained, an area occupied by the crystalline material per unit area is calculated through use of image processing software "Image-Pro Plus (manufactured by Media Cybernetics Inc.)". Regarding an analysis area, analysis is performed within a circle having a diameter of 2.0 μm in the vicinity of an apex at which the curvature of the toner particle is the smallest, and the above-mentioned analysis is performed on 100 toner particles. The ratio $S_1$ (%) of the area occupied by the crystalline material per area of the toner surface in the first surface region of the toner is calculated.

<Method of Calculating Ratio of Area Occupied by Crystalline Material in Second Surface Region of Toner and Dispersion Diameter of Domains>

A vacuum electron staining apparatus (Filgen, Inc., VSC4R1H) is used for calculating a ratio $S_2$ (%) of an area occupied by a crystalline material per area of a toner surface in the vicinity of the surface (second surface region) of the toner and a dispersion diameter of domains formed of the crystalline material. The calculation is performed through use of an image obtained by observing a reflected electron image of the toner, which has been stained in a $RuO_4$ gas atmosphere at 500 Pa for 15 minutes, with a field emission scanning electron microscope S-4800 (Hitachi High-Technologies Corporation).

Liquid nitrogen is injected into an anticontamination trap mounted on the casing of the S-4800 until the liquid nitrogen flows out, followed by standing for 30 minutes. The "PC-SEM" of the S-4800 is activated to perform flushing (the cleaning of a FE chip that is an electron source). The acceleration voltage-displaying portion of a control panel on the screen of the S-4800 is clicked, and the [Flushing] button thereof is pressed to open a flushing performance dialog. The fact that a flushing intensity is 2 is recognized, and the flushing is performed. The fact that an emission current caused by the flushing is from 20 μA to 40 μA is recognized. A sample holder is inserted into the sample chamber of the casing of the S-4800. An [Origin] button on the control panel is pressed to move the sample holder to an observation position.

The acceleration voltage-displaying portion is clicked to open an HV setting dialog, followed by the setting of an acceleration voltage to [5.0 kV] and an emission current to [20 μA]. In a [Basic] tab of an operation panel, a signal selection mode is set to [SE]. [Up (U)] and [+BSE] are selected in a SE detector, and [L. A. 100] is selected in a selection box on the right side of the [+BSE] to set a mode for observing with a reflected electron image. Similarly, in the [Basic] tab of the operation panel, a probe current of an electro-optical system condition block is set to [Normal], a focus mode is set to [UHR], and WD is to [3.0 mm]. An [ON] button in the acceleration voltage-displaying portion of the control panel is pressed to apply an acceleration voltage. The domains of the crystalline material observed in black under the above-mentioned observation conditions are brought into focus, and a SEM image is stored.

Regarding the image thus obtained, the ratio of an area occupied by the crystalline material and the dispersion diameter of the domains are calculated through use of image processing software "Image-Pro Plus (manufactured by Media Cybernetics Inc.)". Regarding an analysis area, analysis is performed within a circle having a diameter of 2.0 μm in the vicinity of an apex at which the curvature of the toner particle is the smallest.

Regarding the dispersion diameter of the domains, all the domains each having an area circle-equivalent diameter of 5 nm or more and 500 nm or less are subjected to measurement in an analysis area of 100 toner particles, and the number average of their area circle-equivalent diameters is calculated. The presence or absence of the formation of minute domains of the crystalline material is determined, and the number average thus obtained is defined as the dispersion diameter of the domains of the crystalline material.

Regarding the ratio of the area occupied by the crystalline material, the above-mentioned analysis was performed on 100 toner particles, and the ratio $S_2$ (%) of the area occupied by the crystalline material per area of the toner surface in the second surface region of the toner was calculated.

<Method of calculating Dispersion Diameter of Domains of Crystalline Material>

The dispersion diameter of the domains of the crystalline material means a number average determined from the area circle-equivalent diameters of the domains of the crystalline material based on the sectional image of the toner particles observed with a transmission electron microscope (TEM).

The cross-section of the toner particles observed with the transmission electron microscope (TEM) is created as described below.

An Os film (5 nm) and a naphthalene film (20 nm) are applied as protective films to the toner through use of an osmium plasma coater (Filgen, Inc., OPC80T), and the resultant is embedded in a photocurable resin D800 (JEOL Ltd.). Then, the resultant is cut at a cutting speed of 1 mm/s with an ultrasonic ultramicrotome (Leica Microsystems, UC7) to create a toner particle cross-section having a thickness of 60 nm (or 70 nm).

The cross-section thus obtained is stained in a $RuO_4$ gas atmosphere at 500 Pa for 15 minutes through use of a vacuum electron staining apparatus (Filgen, Inc., VSC4R1H), and STEM observation is performed through use of a STEM function of a STEM (JEOL Ltd., JEM2800). The size of a STEM probe is 1 nm, and an image having a size of 1,024 pixels×1,024 pixels is obtained.

For the obtained image, the area circle-equivalent diameters of the domains are determined through use of image processing software "Image-Pro Plus (manufactured by Media Cybernetics Inc.)".

When the cross-section of the toner particles is subjected to ruthenium staining, the crystalline material is not stained. Accordingly, when the TEM observation is performed, the domains of the crystalline material look black, and hence the domains can be identified. In calculation of the dispersion diameter, the cross-section of each of 100 toner particles is observed. All the domains each having a dispersion diameter of 5 nm or more and 500 nm or less are subjected to measurement, and the number average of their dispersion diameters is calculated. The presence or absence of the formation of minute domains of the crystalline material is determined, and the number average thus obtained is defined as the dispersion diameter of the domains of the crystalline material.

<Method of calculating Surface Vicinity Existence Index of Magnetic Material>

The surface vicinity existence index of the magnetic material refers to the number of pieces of the magnetic material existing in the vicinity of the surface of the magnetic toner particle, and represents the number of pieces per 1 $\mu m^2$ of the surface area.

The surface vicinity existence index is calculated through use of an image obtained by observing a reflected electron image of the toner with a field emission scanning electron microscope S-4800 (Hitachi High-Technologies Corporation).

Liquid nitrogen is injected into an anticontamination trap mounted on the casing of the S-4800 until the liquid nitrogen flows out, followed by standing for 30 minutes. The "PC-SEM" of the S-4800 is activated to perform flushing (the cleaning of a FE chip that is an electron source). The acceleration voltage-displaying portion of a control panel on the screen of the S-4800 is clicked, and the [Flushing] button thereof is pressed to open a flushing performance dialog. The fact that a flushing intensity is 2 is recognized, and the flushing is performed. The fact that an emission current caused by the flushing is from 20 μA to 40 μA is recognized. A sample holder is inserted into the sample chamber of the casing of the S-4800. An [Origin] button on the control panel is pressed to move the sample holder to an observation position.

The acceleration voltage-displaying portion is clicked to open an HV setting dialog, followed by the setting of an acceleration voltage to [5.0 kV] and an emission current to [20 μA]. In a [Basic] tab of an operation panel, a signal selection mode is set to [SE]. [Up (U)] and [+BSE] are selected in a SE detector, and [L. A. 100] is selected in a selection box on the right side of the [+BSE] to set a mode for observing with a reflected electron image. Similarly, in the [Basic] tab of the operation panel, a probe current of an electro-optical system condition block is set to [Normal], a focus mode is set to [UHR], and WD is to [3.0 mm]. An [ON] button in the acceleration voltage-displaying portion of the control panel is pressed to apply an acceleration voltage.

Under the above-mentioned observation conditions, the magnetic material is observed in a state of glowing white. The glowing magnetic material is brought into focus, and a SEM image thereof is stored. This image is subjected to image analysis software image-J so that the number of pieces of the magnetic material may be detected as the peak of brightness, followed by the calculation of the number of pieces of the magnetic material per unit area. The above-mentioned analysis is performed on 100 toner particles, and the number average of the measured values is defined as a surface vicinity existence index.

<Measurement of IR and Method of calculating [Si—O—Si]/[Si—C] Value>

A FT-IR spectrum is measured by an ATR method through use of a Fourier transform infrared spectrophotometer (Spectrum One: manufactured by PerkinElmer Co., Ltd.) equipped with a universal ATR measurement accessory (Universal ATR Sampling Accessory). A specific measurement procedure is as described below.

The incident angle of infrared light (X=5 m) is set to 45°. A Ge ATR crystal (refractive index: 4.0) is used as the ATR crystal. Other conditions are as described below.

Range

Start: 4,000 $cm^{-1}$

End: 600 $cm^{-1}$

Duration

Scan number: 16

Resolution: 4.00 $cm^{-1}$ (1) The Ge ATR crystal is placed on an apparatus.

(2) 0.01 g of a toluene extract of iron oxide particles is precisely weighed on the ATR crystal.

(3) The sample is pressurized with a pressure arm, and its FT-IR is measured (Force Gauge: 90).

(4) The FT-IR spectrum thus obtained is subjected to baseline correction by automatic correction.

(5) A ratio of maximum values of absorption peak intensities [Si—O—Si]/[Si—C] between a range of from 990 $cm^{-1}$ to 1,040 $cm^{-1}$ [Si—O—Si] and a range of from 1,240 $cm^{-1}$ to 1,280 $cm^{-1}$ [Si—C] is calculated.

<Method of calculating Value obtained by dividing Mass Change Ratio of Magnetic Material with Respect to Relative Humidity by Specific Surface Area>

As an indicator of a water content of a hydrophobized magnetic material, a value (mass change ratio/specific surface area), which is obtained by dividing a mass change ratio of the hydrophobized magnetic material when the hydrophobized magnetic material is left to stand under an environment of a temperature of 30° C. and a relative humidity of 0% for 24 hours and then under an environment of a temperature of 30° C. and a relative humidity of 80% for 1 hour by a specific surface area of the hydrophobized magnetic material, is calculated.

The mass change ratio of the magnetic material is measured through use of a calorie measuring apparatus "Q5000SA" (manufactured by TA Instruments). About 20 mg of the magnetic material is placed on a sample pan. Programming is performed so that the environment in a chamber may be set to have a temperature of 30° C. and a relative humidity of 0%, and the environment may be kept for 24 hours, and then the environment of a temperature of 30° C. and a relative humidity of 80% may be kept for 1 hour, followed by the start of measurement. When the mass after the elapse of 24 hours from the start is represented by TGA1, and the mass after the elapse of 1 hour under the environment of a temperature of 30° C. and a relative humidity of 80% is represented by TGA2, ((TGA2−TGA1)/TGA1)×100 is defined as a mass change ratio (%).

In addition, the specific surface area of the magnetic material is measured by a BET method based on nitrogen adsorption in conformity with JIS Z8830 (2001). An automatic specific surface area/pore distribution measuring apparatus "TriStar 3000" (manufactured by Shimadzu Corporation), which adopts a gas adsorption method based on a constant volume method as a measuring system, is used as a measuring apparatus. The setting of measurement conditions and the analysis of measurement data are performed through use of dedicated software "TriStar 3000 Version 4.00" included with this apparatus, and a vacuum pump, a nitrogen gas pipe, and a helium gas pipe are connected to the apparatus. A nitrogen gas is used as an adsorption gas, and a value calculated by a BET multipoint method is defined as a BET specific surface area in the present invention. The BET specific surface area is calculated as described below. First, the nitrogen gas is caused to adsorb to the magnetic material, and an equilibrium pressure P (Pa) in a sample cell in this case and a nitrogen adsorption amount Va (mol·$g^{-1}$) of the magnetic material are measured. Then, a relative pressure Pr, which is a value obtained by dividing the equilibrium pressure P (Pa) in the sample cell by a saturated vapor pressure Po (Pa) of nitrogen, is plotted on a horizontal axis, and the nitrogen adsorption amount Va (mol·$g^{-1}$) is plotted on a vertical axis, to thereby obtain an adsorption isotherm.

Next, an adsorption amount Vm (mol·$g^{-1}$) of a monomolecular layer, which is an adsorption amount required for forming the monomolecular layer on the surface of the magnetic material, is determined by applying the following BET formula.

$$Pr/Va(1-Pr) = 1/(Vm\times C) + (C-1)\times Pr/(Vm\times C)$$

where C represents a BET parameter, which is a variable that varies depending on the kind of a measurement sample, the kind of the adsorption gas, and an adsorption temperature.

When the X-axis represents PR, and the Y-axis represents Pr/Va(1−Pr), the BET formula can be interpreted as a straight line with a slope of (C−1)/(Vm×C) and an intercept of 1/(Vm×C) (this straight line is called a BET plot).

$$\text{Slope of straight line} = (C-1)/(Vm\times C)$$

$$\text{Intercept of straight line} = 1/(Vm\times C)$$

When an actual value of Pr and an actual value of Pr/Va(1−Pr) are plotted on a graph, and a straight line is drawn by a least square method, values of the slope and intercept of the straight line can be calculated. When simultaneous equations of the above-mentioned slope and intercept are solved through use of those values, Vm and C can be calculated. Further, from Vm calculated in the foregoing and a molecule occupied sectional area (0.162 $nm^2$) of a nitrogen molecule, the BET specific surface area S ($m^2 \cdot g^{-1}$) of the magnetic material is calculated based on the following expression.

$$S = Vm \times N \times 0.162 \times 10^{-18}$$

where N represents an Avogadro number ($mol^{-1}$).

The measurement using the apparatus follows the "TriStar 3000 Instruction Manual V4.0" included with the apparatus, but specifically, the measurement is performed by the following procedure.

The tare of a dedicated glass sample cell (stem diameter: ⅜ inch, volume: about 5 ml) that has been sufficiently washed and dried is precisely weighed. Then, about 1.5 g of a magnetic material is loaded into the sample cell through use of a funnel. The sample cell containing the magnetic material is set in a pretreatment apparatus "VacPrep 061" (manufactured by Shimadzu Corporation) in which a vacuum pump and a nitrogen gas pipe are connected to each other, and vacuum degassing is continued at 23° C. for about 10 hours. At the time of the vacuum degassing, the degassing is gradually performed while a valve is adjusted so that the magnetic material may not be attracted to the vacuum pump. The pressure in the cell is gradually decreased along with the degassing and finally reaches about 0.4 Pa (about 3 mTorr). After the completion of the vacuum degassing, a nitrogen gas is gradually injected to return the pressure in the sample cell to an atmospheric pressure, and the sample cell is taken out from the pretreatment apparatus. Then, the mass of this sample cell is precisely weighed, and the accurate mass of the magnetic material is calculated from the difference from the tare. In this case, the sample cell is covered with a rubber stopper during the weighing so that the magnetic material in the sample cell may not be contaminated with moisture and the like in the atmosphere. Next, a dedicated "isothermal jacket" is attached to a stem portion of the sample cell containing the magnetic material. Then, a dedicated filler rod is inserted into the sample cell, and the sample cell is set in an analysis port of the apparatus. The isothermal jacket is a tubular member having an inner surface formed of a porous material and an outer surface formed of an impermeable material, which can suck up liquid nitrogen to a certain level by capillarity. Subsequently, the free space of the sample cell including a connecting tool is measured. The free space is calculated by measuring the volume of the sample cell through use of a helium gas at 23° C., subsequently cooling the sample cell with liquid nitrogen, and then measuring the volume of the sample cell through use of a helium gas in the same manner, followed by conversion from the difference in volume. In addition, the saturated vapor pressure Po (Pa) of nitrogen is automatically measured separately through use of a Po tube built in the apparatus. Next, after vacuum degassing in the sample cell is performed, the sample cell is cooled with liquid nitrogen while the vacuum degassing is continued. Then, a nitrogen gas is introduced into the sample cell in a stepwise manner to cause nitrogen molecules to adsorb to the magnetic material. In this case, the above-mentioned adsorption isotherm is obtained by measuring the equilibrium pressure P (Pa) as required, and hence this adsorption isotherm is converted into a BET plot. The points of the relative pressure Pr for collecting data are set to a total of 6 points of 0.05, 0.10, 0.15, 0.20, 0.25, and 0.30. A straight line is drawn with respect to the measurement data thus obtained by a least square method, and Vm is calculated from the slope and intercept of the straight line. Further, through use of the value of Vm, a BET specific surface area of the magnetic material is calculated as described above.

EXAMPLES

Now, the present invention is described more specifically with reference to Examples, but the present invention is not limited to these Examples. In the following formulations, the terms "part(s)" and "%" are based on a mass unless otherwise stated.

Production Example of Magnetic Material 1

In a ferrous sulfate aqueous solution, 1.00 equivalent to 1.10 equivalents of a caustic soda solution with respect to an iron element, P205 in an amount of 0.15 mass % in terms of a phosphorus element with respect to the iron element, and $SiO_2$ in an amount of 0.50 mass % in terms of a silicon element with respect to the iron element were mixed to prepare an aqueous solution containing ferrous hydroxide. The pH of the aqueous solution was set to 8.0, and an oxidation reaction was performed at 85° C. while air was blown thereinto. Thus, a slurry liquid containing seed crystals was prepared. Next, a ferrous sulfate aqueous solution was added to the slurry liquid so that the amount was from 0.90 equivalent to 1.20 equivalents with respect to the initial amount of an alkali (sodium component of caustic soda). Then, the slurry liquid was maintained at a pH of 7.6, and the oxidation reaction was allowed to proceed while air was blown thereinto. Thus, a slurry liquid containing iron oxide was obtained. After the slurry liquid was filtered and washed, the water-containing slurry liquid was once taken out. In this case, a small amount of a water-containing sample was collected, and the water content was measured. Next, the water-containing sample was loaded into another aqueous medium without being dried, and the slurry was redispersed with a pin mill under stirring while being circulated so that the pH of a redispersion liquid was adjusted to 9.0 (treatment pH: 1). Then, under stirring, 1.4 parts by mass of isobutyltrimethoxysilane was added to 100 parts by mass of the iron oxide particles (the amount of the iron oxide particles was calculated as a value obtained by subtracting the water content from the amount of the water-containing sample), and hydrolysis was performed at a liquid temperature of 45° C. After that, a hydrophobized magnetic material generated by performing the hydrophobic treatment as follows was filtered with a filter press, washed with a large amount of water, and then dried at 120° C. for 2 hours: the slurry was dispersed with a pin mill under sufficient stirring while being circulating so that the pH of the dispersion liquid was adjusted to 9.0 (treatment pH: 2). The particles thus obtained were subjected to shredding treatment and passed through a sieve having an opening of 100 μm, to thereby obtain a magnetic material 1 having a number-average particle diameter of 0.26 μm.

Production Examples of Magnetic Materials 2 to 13, and 15 and 16

Magnetic materials 2 to 13, and 15 and 16 were obtained under the same conditions through use of the same apparatus as those in the case of producing the magnetic material 1 except that the hydrophobizing agent and treatment conditions (hydrophobizing agent and treatment pHs) were changed to conditions shown in Table 1. The physical property values of the magnetic materials are shown in Table 1.

Production Example of Magnetic Material 14

In a ferrous sulfate aqueous solution, 1.00 equivalent to 1.10 equivalents of a caustic soda solution with respect to an iron element, P205 in an amount of 0.15 mass % in terms of a phosphorus element with respect to the iron element, and $SiO_2$ in an amount of 0.50 mass % in terms of a silicon element with respect to the iron element were mixed to prepare an aqueous solution containing ferrous hydroxide. The pH of the aqueous solution was set to 8.0, and an oxidation reaction was performed at 85° C. while air was blown thereinto. Thus, a slurry liquid containing seed crystals was prepared.

Next, a ferrous sulfate aqueous solution was added to the slurry liquid so that the amount was from 0.90 equivalent to 1.20 equivalents with respect to the initial amount of an alkali (sodium component of caustic soda). Then, the slurry liquid was maintained at a pH of 7.6, and the oxidation reaction was allowed to proceed while air was blown thereinto. Thus, the pH was adjusted to 6.0 in the final stage of the oxidation reaction. The resultant was washed with water and dried, and the particles thus obtained were subjected to shredding treatment, to thereby obtain a magnetic material having a volume-average particle diameter of 0.23 μm.

As a hydrophobizing agent, 30 parts by mass of isobutyltrimethoxysilane was added dropwise to 70 parts by mass of ion-exchanged water under stirring. Then, the aqueous solution was kept at a pH of 5.5 and a temperature of 55° C., and was hydrolyzed by being dispersed at a peripheral speed of 0.46 m/s for 120 minutes through use of a disper blade. After that, the pH of the aqueous solution was adjusted to 7.0, and the aqueous solution was cooled to 10° C. to stop the hydrolysis reaction. In this manner, an aqueous solution containing a silane compound was obtained.

100 Parts by mass of iron oxide particles were loaded into a high-speed mixer (LFS-2 type manufactured by Fukae Powtec Co., Ltd.), and 8.0 parts by mass of an aqueous solution containing a silane compound was added dropwise over 2 minutes under stirring at a rotation speed of 2,000 rpm. After that, the materials were mixed and stirred for 5 minutes. Then, in order to increase the sticking property of the silane compound, the mixture was dried at 40° C. for 1 hour to reduce moisture. Then, the mixture was dried at 110° C. for 3 hours to allow a condensation reaction of the silane compound to proceed. After that, the resultant was shredded and passed through a sieve having an opening of 100 μm to obtain a magnetic material 14. The treatment conditions and the physical property values of the magnetic material are shown in Table 1.

Production Example of Magnetic Material 17

In a ferrous sulfate aqueous solution, 1.00 equivalent to 1.10 equivalents of a caustic soda solution with respect to an iron element, P205 in an amount of 0.15 mass % in terms of a phosphorus element with respect to the iron element, and $SiO_2$ in an amount of 0.50 mass % in terms of a silicon element with respect to the iron element were mixed to prepare an aqueous solution containing ferrous hydroxide. The pH of the aqueous solution was set to 8.0, and an oxidation reaction was performed at 85° C. while air was blown thereinto. Thus, a slurry liquid containing seed crystals was prepared.

Next, a ferrous sulfate aqueous solution was added to the slurry liquid so that the amount was from 0.90 equivalent to 1.20 equivalents with respect to the initial amount of an alkali (sodium component of caustic soda). Then, the slurry liquid was maintained at a pH of 7.6, and the oxidation reaction was allowed to proceed while air was blown thereinto. Thus, the pH was adjusted to 6 in the final stage of the oxidation reaction. The resultant was washed with water and dried, and the particles thus obtained were subjected to shredding treatment, to thereby obtain magnetic particles having a volume-average particle diameter of 0.23 μm.

After the magnetic particles were loaded into a Henschel mixer (Nippon Coke & Engineering Co., Ltd. (former Mitsui Miike Chemical Engineering Machinery, Co., Ltd.)), silicone oil (3.8 parts by mass) was added by spraying under a state in which untreated iron oxide particles were dispersed at a rotation speed of 34.5 m/s, and then the oil was dispersed as it was for 10 minutes. Then, the resultant was passed through a sieve having an opening of 100 μm to obtain a magnetic material 17. The treatment condition and the physical property values of the magnetic material are shown in Table 1.

Production Example of Toner Particles 1

450 Parts of a $Na_3PO_4$ aqueous solution (0.1 mol/L) was loaded into 720 parts of ion-exchanged water, and the mixture was warmed to 60° C. Then, 67.7 parts by mass of a $CaCl_2$) aqueous solution (1.0 mol/L) was added. The mixture was stirred at 1,200 r/min through use of Claremix (manufactured by M Technique Co., Ltd.) to prepare an aqueous medium.

(Magnetic Material Dispersion Step)

| | |
|---|---|
| Styrene | 76.0 parts |
| n-Butylacrylate | 24.0 parts |
| 1,6-Hexanediol diacrylate | 0.5 part |
| Iron complex of monoazo dye | 1.5 parts |
| (T-77: manufactured by Hodogaya Chemical Co., Ltd.) | |
| Magnetic material 1 | 100.0 parts |
| Non-crystalline saturated polyester resin | 5.0 parts |

(Saturated polyester resin obtained by a polycondensation reaction of an ethylene oxide 2-mol adduct of bisphenol A and terephthalic acid; number-average molecular weight (Mn)=5,000, acid value=6 mgKOH/g, glass transition temperature (Tg=68°) C)

The above-mentioned formulation was treated at a peripheral speed of a rotor of 35 m/s for 2 hours through use of Cavitron (manufactured by Eurotech), and the materials were uniformly dispersed and mixed to obtain a magnetic material-containing polymerizable monomer.

(Polymerizable Monomer Composition Preparation Step)

The magnetic material-containing polymerizable monomer obtained in the magnetic material dispersion step was warmed to 63° C., and the following raw materials were added thereto. The mixture was treated at a peripheral speed of a rotor of 35 m/s for 1 hour through use of Cavitron (manufactured by Eurotech) to obtain a polymerizable monomer composition.

| | |
|---|---|
| Crystalline material 1 | 10.0 parts |
| Crystalline material 3 | 5.0 parts |

(Granulation Step and Polymerization Step)

The above-mentioned polymerizable monomer composition was loaded into the above-mentioned aqueous medium, and the mixture was stirred at 1,200 r/min for 7 minutes through use of Claremix (manufactured by M Technique Co., Ltd.) under a nitrogen atmosphere at 60° C. As a polymerization initiator, 9.0 parts of tert-butyl peroxypivalate was added. Then, the resultant was stirred for 13 minutes to be granulated. Next, a polymerization reaction was performed at 70° C. for 4 hours under stirring with a paddle stirring blade. After the completion of the reaction, the temperature of a dispersion containing resin particles was raised to 100° C. and held for 2 hours.

(Cooling Step)

Then, as a cooling step, water at normal temperature was added to the suspension. The suspension was cooled from 100° C. to 50° C. at a rate of 40° C./min, and then allowed to cool to normal temperature. After that, hydrochloric acid was added to the suspension, and the suspension was sufficiently washed to dissolve a dispersion stabilizer, followed by filtering and drying. Thus, toner particles 1 were obtained. The formulation and production method of the toner particles 1 are shown in Table 3.

Production Example of Toner 1

100 Parts of the toner particles 1, and 0.8 part of hydrophobic silica fine particles having a BET value of 300 $m^2/g$ and a number-average primary particle diameter of 8 nm were mixed with a Henschel mixer (Mitsui Miike Chemical Engineering Machinery, Co., Ltd.) to obtain a toner 1. The physical property values of the toner 1 are shown in Table 4.

Production Examples of Toner Particles 2 to 21 and Toner Particles 23 to 26

Toner particles 2 to 21 and toner particles 23 to 26 were obtained in the same manner as in the production example of the toner particles 1 except that the formulation and production method of the toner particles were changed as shown in Table 3 in the production example of the toner particles 1. Kind numbers of the first crystalline material and the second crystalline material that were used are shown in Table 3, and the relationship between the kind number and the name of the crystalline material is shown in Table 2. Crystalline polyester 1 in Table 2 is a condensate of 1,9-nonanediol and sebacic acid (acid value: 2.0 mgKOH/g, weight-average molecular weight Mw: 20,400).

Production Example of Toner Particles 22

(Preparation of Resin Particle Dispersion Liquid 1)

Terephthalic acid: 30.0 parts

Fumaric acid: 70.0 parts

Ethylene oxide adduct of bisphenol A: 5.0 parts

Propylene oxide adduct of bisphenol A: 95.0 parts

The above-mentioned materials were loaded into a flask having an internal capacity of 5 liters and equipped with a stirring device, a nitrogen introduction pipe, a temperature sensor, and a rectifying column. A temperature in the flask was raised to 210° C. over 1 hour, and 1 part of titanium tetraethoxide was loaded with respect to 100 parts of the above-mentioned materials. The temperature was raised to 230° C. over 0.5 hour while generated water was distilled away, and a dehydration condensation reaction was continued at the temperature for 1 hour. After that, a reaction product was cooled. In this manner, an amorphous resin 1 having a weight-average molecular weight of 18,500, an acid value of 14 mgKOH/g, and a glass transition temperature of 59° C. was synthesized.

40 Parts of ethyl acetate and 25 parts of 2-butanol were loaded into a container equipped with a temperature control unit and a nitrogen substitution unit to prepare a mixed solvent. Then, 100 parts of the amorphous resin 1 was gradually loaded to be dissolved. A 10 mass % ammonia aqueous solution (amount equivalent to 3 times as large as the molar ratio of the acid value of the resin) was added thereto, and the mixture was stirred for 30 minutes.

Next, the inside of the container was substituted with dry nitrogen, and the temperature was kept at 40° C. 400 Parts of ion-exchanged water was added dropwise at a rate of 2 parts/min under stirring of the mixed solution, to thereby perform emulsification. After the completion of the dropping, the temperature of an emulsion was returned to room temperature (from 20° C. to 25° C.), and bubbling was performed with dry nitrogen for 48 hours under stirring to reduce the amount of each of ethyl acetate and 2-butanol to 1,000 ppm or less. Thus, a resin particle dispersion liquid having dispersed therein resin particles having a volume-average particle diameter of 200 nm was obtained. Ion-exchanged water was added to the resin particle dispersion liquid to adjust a solid content to 20 mass % to obtain a resin particle dispersion liquid (1).

(Preparation of Resin Particle Dispersion Liquid 2)

A resin particle dispersion liquid 2 was obtained in the same manner as in the preparation of the resin particle dispersion liquid 1 except that an amorphous resin 2 was used instead of the amorphous resin 1.

The amorphous resin 2 was prepared as described below. 100 Parts by mass of a mixture obtained by mixing the following materials at a molar ratio described below and 0.52 part by mass of tin di(2-ethylhexanoate) serving as a catalyst were loaded into a polymerization tank equipped with a nitrogen introduction line, a dehydration line, and a stirring machine.

Terephthalic acid: 91.0 mol

Bisphenol A: 58.0 mol

Ethylene glycol: 36.0 mol

Isosorbide (structural formula 1): 4.0 mol

Next, the inside of the polymerization tank was brought into a nitrogen atmosphere, and then a polycondensation reaction was performed over 6 hours while heating was performed at 200° C. Further, the temperature was raised to 210° C., and then 0.25 part of trimellitic anhydride was added. The pressure inside the polymerization tank was reduced to 40 kPa. After that, the condensation reaction was further performed. This resin is defined as the amorphous resin 2 (weight-average molecular weight Mw: 12,100).

Structural formula 1

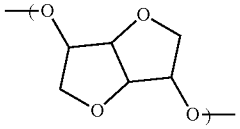

(Preparation of Resin Particle Dispersion Liquid 3)

A resin particle dispersion liquid 3 was obtained in the same manner as in the preparation of the resin particle dispersion liquid 1 except that an amorphous resin 3 was used instead of the amorphous resin 1.

The amorphous resin 3 was prepared as described below. 100 Parts by mass of a mixture obtained by mixing the following materials at a molar ratio described below and 0.52 part by mass of tin di(2-ethylhexanoate) serving as a catalyst were loaded into a polymerization tank equipped with a nitrogen introduction line, a dehydration line, and a stirring machine.

Terephthalic acid: 40.0 mol
Isophthalic acid: 60.0 mol
Bisphenol A: 61.0 mol
Ethylene glycol: 38.0 mol Next, the inside of the polymerization tank was brought into a nitrogen atmosphere, and then a polycondensation reaction was performed over 6 hours while heating was performed at 200° C. Further, the temperature was raised to 210° C., and then 5.0 parts of trimellitic anhydride was added. The pressure inside the polymerization tank was reduced to 40 kPa. After that, the condensation reaction was further performed. This resin is defined as the amorphous resin 3 (weight-average molecular weight Mw: 9,800).

(Preparation of Colorant Particle Dispersion Liquid 1)

Cyan pigment C.I. Pigment Blue 15:3 (copper phthalocyanine manufactured by DIC Corporation, product name: Fastogen Blue LA5380): 70.0 parts
Anionic surfactant (Neogen RK manufactured by DKS Co., Ltd.): 5.0 parts
Ion-exchanged water: 200.0 parts The above-mentioned materials were mixed, and were dispersed for 10 minutes through use of a homogenizer (ULTRA-TURRAX T50 manufactured by IKA Co., Ltd.). Ion-exchanged water was added so that the solid content in the dispersion liquid was 20 mass %. Thus, a colorant particle dispersion liquid having dispersed therein colorant particles having a volume-average particle diameter of 190 nm was obtained.

(Preparation of Release Agent Particle Dispersion Liquid 1)

Crystalline material 1: 100.0 parts
Anionic surfactant (Neogen RK manufactured by DKS Co., Ltd.): 5.0 parts
Ion-exchanged water: 350.0 parts The above-mentioned materials were mixed and heated to 100° C., and dispersed through use of a homogenizer (ULTRA-TURRAX T50 manufactured by IKA Co., Ltd.). After that, the resultant was subjected to dispersion treatment with a Manton Gorin high-pressure homogenizer (manufactured by Manton Gorin Co., Ltd.) to obtain a release agent particle dispersion liquid (solid content: 20 mass %) having dispersed therein release agent particles 1 having a volume-average particle diameter of 90 nm.

(Production of Toner Particles 22)

An apparatus was prepared in which a round stainless steel flask and a container A were connected to each other through a tube pump A so that an accommodated liquid accommodated in the container A was fed to the flask by driving the tube pump A, and the container A and a container B were connected to each other through a tube pump B so that an accommodated liquid accommodated in the container B was fed to the container A by driving the tube pump B. Then, the following operation was performed through use of this apparatus.

Resin particle dispersion liquid 1: 500.0 parts
Colorant particle dispersion liquid 1: 40.0 parts
Anionic surfactant (TaycaPower): 2.0 parts The above-mentioned materials were loaded into the round stainless steel flask, and 0.1 N nitric acid was added thereto to adjust the pH to 3.5. After that, 30.0 parts of a nitric acid aqueous solution having a polyaluminum chloride concentration of 10 mass % was added to the resultant. Subsequently, after the resultant was dispersed at 30° C. through use of a homogenizer (ULTRA-TURRAX T50 manufactured by IKA Co., Ltd.), and then the particle diameter of each of aggregated particles was grown while the temperature was raised at a pace of 1° C./30 min in a heating oil bath.

Meanwhile, 50.0 parts of the resin particle dispersion liquid 3 was loaded into the container A that was a polyester bottle, and 25 parts of the release agent particle dispersion liquid 1 was similarly loaded into the container B. Next, the liquid feeding rate of the tube pump A was set to 0.70 part/min, and the liquid feeding rate of the tube pump B was set to 0.14 part/min. From the time point when the temperature in the round stainless steel flask during formation of aggregated particles reached 37.0° C., the tube pumps A and B were driven to start feeding of the respective dispersion liquids. As a result, while the concentration of the release agent particles was gradually increased, a mixed dispersion liquid having dispersed therein the resin particles and the release agent particles 1 was fed from the container A to the round stainless steel flask during formation of the aggregated particles.

Then, from the time point when the feeding of the respective dispersion liquids to the flask was completed, and the temperature in the flask reached 48° C., the temperature was kept for 30 minutes to form second aggregated particles.

After that, 50 parts of the resin particle dispersion liquid 2 was gently added to the resultant, and the mixture was held for 1 hour, followed by the addition of a 0.1 N sodium hydroxide aqueous solution to adjust the pH to 8.5. After that, the resultant was heated to 85° C. while stirring was continued, followed by the holding of the resultant for 5 hours. After that, the resultant was cooled to 20° C. at a rate of 20° C./min.

The above-mentioned dispersion liquid was filtered and sufficiently washed with ion-exchanged water, followed by drying, to obtain toner particles 22.

Production Example of Toner Particles 27

(Preparation of Resin Particle Dispersion Liquid 4)

Styrene: 89.5 parts
Butyl acrylate: 9.2 parts
Acrylic acid: 1.3 parts
n-Lauryl mercaptan: 3.2 parts The above-mentioned materials were loaded into a flask having an internal capacity of 5 liters and equipped with a stirring device, a nitrogen introduction pipe, a temperature sensor, and a rectifying column, and were dissolved to obtain a mixed solution. An aqueous solution obtained by mixing 1.5 parts of Neogen RK (manufactured by DKS Co., Ltd.) with 150.0 parts of ion-exchanged water was added to the mixed solution and dispersed therein.

Further, while the resultant was slowly stirred for 10 minutes, an aqueous solution obtained by mixing 0.3 part of potassium persulfate with 10.0 parts of ion-exchanged water was added to the resultant.

After the inside of the flask was substituted with nitrogen, emulsion polymerization was performed at 70° C. for 6 hours. After the completion of the polymerization, a reaction solution was cooled to room temperature, and ion-exchanged water was added thereto to obtain a resin particle dispersion liquid 4 having a solid content concentration of 12.5 mass % and a volume-based median diameter of 0.2 m.

Resin particle dispersion liquid 4: 500.0 parts

Colorant particle dispersion liquid 1: 40.0 parts

Release agent dispersion liquid 1: 50.0 parts

The above-mentioned materials were loaded into a round stainless steel flask, and were dispersed through use of a homogenizer (manufactured by IKA Co., Ltd.: ULTRA-TURRAX T50). The temperature in the container was adjusted to 30° C. under stirring, and 1 mol/L hydrochloric acid was added to adjust the pH of the mixture to 5.0. After the resultant was left to stand for 3 minutes, an increase in temperature was started, and the temperature was raised to 50° C. to generate aggregated particles. In this state, the particle diameter of each of the aggregated particles was measured. When the weight-average particle diameter of the aggregated particles reached 6.2 m, a 1 mol/L sodium hydroxide aqueous solution was added to adjust the pH to 8.0, thereby stopping the growth of the particles.

After that, the temperature was raised to 95° C., and fusion and spheroidization of the aggregated particles were performed. When the average circularity of the particles reached 0.980, a decrease in temperature was started to lower the temperature to 30° C. Thus, a toner particle dispersion liquid 1 was obtained.

Hydrochloric acid was added to the toner particle dispersion liquid 1 thus obtained to adjust the pH to 1.5 or less, and the mixture was left to stand under stirring for 1 hour. Then, the mixture was subjected to solid-liquid separation with a pressure filter to obtain a toner cake.

After that, the toner cake was dispersed again in ion-exchanged water. Dispersion and washing were repeated until the electrical conductivity of the ion-exchanged water was sufficiently decreased. Thus, wet cake-like toner particles were obtained. After that, the wet cake-like toner particles were shredded and loaded into a constant-temperature reservoir at 40° C. for 70 hours, followed by sufficient drying, to obtain toner particles 27 as powder.

Production Example of Toner Particles 28

(Production of Polyester Resin 1)

The following materials were mixed in a reaction vessel equipped with a cooling tube, a stirring machine, and a nitrogen introduction pipe.

Polyoxypropylene(2.2)-2,2-bis(4-hydroxyphenyl)propane: 58.0 parts

Ethylene glycol: 8.0 parts

Terephthalic acid: 31.0 parts

Trimellitic anhydride: 3.0 parts

Dibutyltin oxide: 0.3 part

After the inside of the system was substituted with nitrogen by a pressure-reducing operation, the materials were heated to 210° C. and reacted for 5 hours while nitrogen was introduced to remove generated water. Then, the temperature was gradually raised to 230° C. under reduced pressure while stirring was continued. The resultant was further reacted for 3 hours to synthesize a polyester resin 1. The resin had a weight-average molecular weight Mw of 9,500 and a Tg of 68° C.

(Production of Toner Core Particles 28)

The following materials were well mixed with an FM mixer (manufactured by Nippon Coke & Engineering Co., Ltd.) and then melt-kneaded with a twin-screw kneader (manufactured by Ikegai Ironworks Corp).

Polyester resin 1: 100.0 parts

"Acrybase" (trademark) FCA-201-PS manufactured by Fujikura Kasei Co., Ltd.: 3.0 parts Crystalline material 1: 10.0 parts Crystalline material 3: 5.0 parts Magnetic material 14: 100.0 parts The kneaded product thus obtained was cooled and coarsely pulverized with a hammer mill to 1 mm or less to obtain a coarsely pulverized product.

Next, the coarsely pulverized product thus obtained was finely pulverized with a Turbo Mill manufactured by Turbo Kogyo Co., Ltd. to obtain a finely pulverized product of about 5 μm. After that, the finely pulverized product was further classified through use of a multi-division classifier utilizing a Coanda effect so that fine powder and coarse powder were discarded. Thus, toner core particles 28 were obtained. The toner core particles 28 had a weight-average particle diameter (D4) of 6.8 μm and a Tg of 58° C.

(Production of Toner Particle Dispersion Liquid 28)

A reaction vessel containing 300.0 parts of ion-exchanged water was maintained at 30° C., and then 50.0 parts of an oxazoline group-containing polymer aqueous solution ("Epocross (trademark) WS-300" manufactured by Nippon Shokubai Co., Ltd., monomer mass ratio: methyl methacrylate/2-vinyl-2-oxazoline=1/9, solid content concentration: 10 mass %) was loaded into the reaction vessel.

The contents of the reaction vessel were sufficiently stirred, and then 300.0 parts of the toner core particles 28 were added. The mixture was stirred at a rotation speed of 200 rpm for 1 hour. After that, 300.0 parts of ion-exchanged water was added.

Subsequently, 6.0 parts of an ammonia aqueous solution having a concentration of 1 mass % was added to the reaction vessel, and the temperature in the reaction vessel was raised to 60° C. at a rate of 0.5° C./min under stirring at a rotation speed of 150 rpm.

After the temperature in the reaction vessel reached 60° C., the contents of the reaction vessel were held at a temperature of 60° C. for 1 hour under stirring at a rotation speed of 100 rpm. When 1 hour elapsed after the temperature in the reaction vessel reached 60° C., 10.0 parts of an acetic acid aqueous solution having a concentration of 1 mass % was added to the reaction vessel. Subsequently, the contents of the reaction vessel were held at a temperature of 60° C. for 30 minutes under stirring at a rotation speed of 100 rpm.

Subsequently, an ammonia aqueous solution having a concentration of 1 mass % was added to the reaction vessel to adjust the pH in the reaction vessel to 7. Subsequently, the contents of the reaction vessel were cooled until their temperature reached room temperature (about 25° C.). Thus, a toner particle dispersion liquid 28 was obtained.

(Production of Toner Particles 28)

The toner particle dispersion liquid 28 was filtered and then dispersed again in ion-exchanged water. Dispersion and washing were repeated until the electrical conductivity of the ion-exchanged water was sufficiently lowered. Thus, wet cake-like toner particles were obtained. After that, the wet cake-like toner particles were shredded and loaded into a constant-temperature reservoir at 40° C. for 70 hours, followed by sufficient drying, to obtain toner particles 28 as powder.

Production Examples of Toners 2 to 28

Toners 2 to 28 were obtained from the toner particles 2 to 28 in the same manner as in the production example of the toner 1. The physical property values of those toners are shown in Table 4.

Example 1

<Evaluation of Developability of Toner through Use of Laser Beam Printer>

A remodeled machine of a commercially available laser beam printer "LBP7600C" manufactured by Canon Inc. was used.

As a remodeling point, the rotation number of a developing roller was set so that the developing roller rotated at a peripheral speed twice as high as that of a drum by changing the gear and software of an evaluation machine body. 40 Grams of a toner was loaded into a toner cartridge of LBP7600C.

(1) Evaluation of Developability in Medium Having Large Irregularities (Solid Image Unevenness and Halftone Image Unevenness)

Through use of CS-680 (A4, basis weight: 68 g/$m^2$, smoothness: 45 seconds, sold by Canon U.S.A., Inc.), which was a medium having large irregularities, an image was output under a normal-temperature and normal-humidity environment (25° C./50% RH).

First, an image having a print percentage of 1% was output on 1,000 sheets.

Further, a full solid image was output on one sheet.

After that, a halftone image (49th gradation image counted from a solid white image when colors ranging from solid white to solid black were divided into 256 gradations) was output on one sheet.

(Evaluation Criteria for Solid Image Unevenness)

The full solid image was measured for its image glossiness through use of a gloss meter PG-3G (manufactured by Nippon Denshoku Industries Co., Ltd.), and maximum and minimum values of the glossiness were determined. The angle of incidence was set to 75 degrees.

A: 0.0 or more and less than 1.0
B: 1.0 or more and less than 2.0
C: 2.0 or more and less than 3.0
D: 3.0 or more and less than 4.0
E: 4.0 or more (Evaluation Criteria for Halftone Image Unevenness)

The halftone image was measured for its image glossiness through use of a gloss meter PG-3G (manufactured by Nippon Denshoku Industries Co., Ltd.), and maximum and minimum values of the glossiness were determined. The angle of incidence was set to 75 degrees.

A: 0.0 or more and less than 1.0
B: 1.0 or more and less than 1.5
C: 1.5 or more and less than 2.0
D: 2.0 or more and less than 3.0
E: 3.0 or more (2) Evaluation of Developability in Medium Having Larger Irregularities (Solid Image Unevenness)

Through use of a medium Multi-Purpose Paper (A4, basis weight: 75 g/$m^2$, smoothness: 25 seconds, sold by Canon U.S.A., Inc.) having larger irregularities as compared to those of the medium of (1), an image was output under a normal-temperature and normal-humidity environment (25° C./50% RH).

First, an image having a print percentage of 1% was output on 1,000 sheets.

Further, a full solid image was output on one sheet.

(Evaluation Criteria for Solid Image Unevenness)

The full solid image was measured for its image glossiness through use of a gloss meter PG-3G (manufactured by Nippon Denshoku Industries Co., Ltd.), and maximum and minimum values of the glossiness were determined. The angle of incidence was set to 75 degrees.

A: 0.0 or more and less than 1.0
B: 1.0 or more and less than 2.0
C: 2.0 or more and less than 3.0
D: 3.0 or more and less than 4.0
E: 4.0 or more (3) Evaluation of Low-Temperature Fixability Through use of LBP7600C remodeled so that its fixation temperature was able to be adjusted, the fixation temperature was changed from 140° C. in increments of 5° C. under a normal-temperature and normal-humidity environment (25° C./50% RH) at a process speed of 300 mm/sec. Regarding the toner to be evaluated, a solid image having a toner laid-on level of 0.40 mg/$cm^2$ was formed on a Business 4200 sheet of a letter size (manufactured by Xerox Corporation, 75 g/$m^2$), and was heated and pressurized without oil to form a fixed image. The fixed image was rubbed 10 times under the application of a load of 7.35 kPa (75 g/$cm^2$) through use of Kimwipes (S-200 manufactured by Crecia Co., Ltd.), and the temperature at which the ratio by which an image density decreased after rubbing as compared to that before the rubbing was less than 5% was defined as a fixation temperature, followed by evaluation based on the following criteria.

For image density measurement, the ratio by which the image density decreased was calculated through use of a color reflection densitometer X-RITE 404A (manufactured by X-Rite Inc.).

(Evaluation Criteria for Low-Temperature Fixability)

A: less than 150° C.
B: 150° C. or more and less than 160° C.
C: 160° C. or more and less than 170° C.
D: 170° C. or more Examples 2 to 22 and Comparative Examples 1 to 6

Image drawing tests were performed in the same manner as in Example 1 except that the toner 1 was changed to the toners 2 to 22 and comparative toners 23 to 28 in Example 1. The evaluation results of the toners are shown in Table 5.

TABLE 1

| | Hydrophobizing conditions | | | | | | | | | |
|---|---|---|---|---|---|---|---|---|---|---|
| | Treatment method | Treatment pH 1 | Treatment pH 2 | Hydrophobizing agent | Alkyl substituent carbon number | Average primary particle diameter (nm) | Hydrophobizing degree | Mass change ratio/specific surface area Mass change ratio (% · g/$m^2$) | Peak intensity ratio of IR [Si-O-Si]/[Si-C] | NEXAFS value |
| Magnetic material 1 | Wet type | 9 | 9 | Isobutyltrimethoxysilane | 4 | 260 | 65 | 0.006 | 1.6 | 47 |
| Magnetic material 2 | Wet type | 9 | 9 | n-hexyltrimethoxysilane | 6 | 260 | 65 | 0.012 | 1.4 | 43 |
| Magnetic material 3 | Wet type | 9.3 | 9 | n-hexyltrimethoxysilane | 6 | 260 | 60 | 0.018 | 1.3 | 45 |
| Magnetic material 4 | Wet type | 9 | 9 | isopropyltrimethoxysilane | 3 | 260 | 60 | 0.002 | 1.4 | 48 |

TABLE 1-continued

| | Hydrophobizing conditions | | | | Alkyl sub- | Average primary | | Mass change ratio/specific surface area | Peak intensity ratio of | |
|---|---|---|---|---|---|---|---|---|---|---|
| | Treatment method | Treatment pH 1 | Treatment pH 2 | Hydrophobizing agent | stituent carbon number | particle diameter (nm) | Hydrophobizing degree | Mass change ratio (% · g/m$^2$) | IR [Si-O-Si]/[Si-C] | NEXAFS value |
| Magnetic material 5 | Wet type | 9 | 9 | n-hexyltrimethoxysilane | 6 | 260 | 55 | 0.02 | 1.4 | 42 |
| Magnetic material 6 | Wet type | 9 | 9 | n-hexyltrimethoxysilane | 6 | 260 | 80 | 0.002 | 1.3 | 42 |
| Magnetic material 7 | Wet type | 9 | 9 | n-hexyltrimethoxysilane | 6 | 260 | 50 | 0.025 | 1.4 | 42 |
| Magnetic material 8 | Wet type | 9 | 9 | n-hexyltrimethoxysilane | 6 | 260 | 45 | 0.028 | 1.4 | 42 |
| Magnetic material 9 | Wet type | 9 | 9 | n-hexyltrimethoxysilane | 6 | 260 | 85 | 0.001 | 1.3 | 42 |
| Magnetic material 10 | Wet type | 8.7 | 9 | n-hexyltrimethoxysilane | 6 | 260 | 45 | 0.025 | 1.4 | 40 |
| Magnetic material 11 | Wet type | 10 | 9 | n-hexyltrimethoxysilane | 6 | 260 | 40 | 0.03 | 1.4 | 55 |
| Magnetic material 12 | Wet type | 9 | 9 | n-octyltrimethoxysilane | 8 | 260 | 50 | 0.025 | 1.4 | 39 |
| Magnetic material 13 | Wet type | 10 | 9 | Ethyltrimethoxysilane | 2 | 260 | 45 | 0.022 | 1.4 | 58 |
| Magnetic material 14 | Dry type | 5.5 | 7 | Isobutyltrimethoxysilane | 4 | 230 | 70 | 0.001 | 1.6 | 34 |
| Magnetic material 15 | Wet type | 5.5 | 7 | Isobutyltrimethoxysilane | 4 | 260 | 65 | 0.004 | 1.6 | 32 |
| Magnetic material 16 | Wet type | 5.5 | 7 | n-hexyltrimethoxysilane | 6 | 260 | 70 | 0.007 | 1.6 | 35 |
| Magnetic material 17 | Dry type | — | — | Silicone oil | — | 230 | 55 | 0.038 | — | — |

TABLE 2

| Crystalline material No. | Name | Melting point (° C.) |
|---|---|---|
| Crystalline material 1 | Behenyl behenate | 75 |
| Crystalline material 2 | Dipentaerythritol hexastearate | 77 |

TABLE 2-continued

| Crystalline material No. | Name | Melting point (° C.) |
|---|---|---|
| Crystalline material 3 | Paraffin wax | 75 |
| Crystalline material 4 | Crystalline polyester 1 | 79 |

TABLE 3

| | | First crystalline material | | Second crystalline material | | Colorant | | |
|---|---|---|---|---|---|---|---|---|
| | Toner production method | Kind | Number of parts (part(s) by mass) | Kind | Number of parts (part(s) by mass) | Kind | Number of parts (part(s) by mass) | Stirrer in dispersion step and adjustment step |
| Toner particles 1 | Suspension polymerization | 1 | 10 | 3 | 5 | Magnetic material 1 | 100 | Cavitron |
| Toner particles 2 | Suspension polymerization | 1 | 10 | 3 | 5 | Magnetic material 1 | 100 | Dissolver |
| Toner particles 3 | Suspension polymerization | 1 | 15 | 3 | 5 | Magnetic material 1 | 100 | Cavitron |
| Toner particles 4 | Suspension polymerization | 1 | 10 | 3 | 5 | Magnetic material 1 | 60 | Dissolver |
| Toner particles 5 | Suspension polymerization | 1 | 10 | 3 | 5 | Magnetic material 1 | 120 | Cavitron |
| Toner particles 6 | Suspension polymerization | 1 | 10 | 3 | 5 | Magnetic material 1 | 40 | Dissolver |
| Toner particles 7 | Suspension polymerization | 1 | 10 | 3 | 5 | Magnetic material 1 | 150 | Cavitron |
| Toner particles 8 | Suspension polymerization | 2 | 10 | 3 | 5 | Magnetic material 1 | 40 | Cavitron |
| Toner particles 9 | Suspension polymerization | 4 | 10 | 3 | 5 | Magnetic material 1 | 40 | Cavitron |
| Toner particles 10 | Suspension polymerization | 4 | 10 | 3 | 5 | Magnetic material 2 | 40 | Cavitron |
| Toner particles 11 | Suspension polymerization | 4 | 10 | 3 | 5 | Magnetic material 3 | 40 | Cavitron |
| Toner particles 12 | Suspension polymerization | 4 | 10 | 3 | 5 | Magnetic material 4 | 40 | Cavitron |
| Toner particles 13 | Suspension polymerization | 4 | 10 | 3 | 5 | Magnetic material 5 | 40 | Cavitron |
| Toner particles 14 | Suspension polymerization | 4 | 10 | 3 | 5 | Magnetic material 6 | 40 | Cavitron |
| Toner particles 15 | Suspension polymerization | 4 | 10 | 3 | 5 | Magnetic material 7 | 40 | Cavitron |
| Toner particles 16 | Suspension polymerization | 4 | 10 | 3 | 5 | Magnetic material 8 | 40 | Cavitron |
| Toner | Suspension | 4 | 10 | 3 | 5 | Magnetic | 40 | Cavitron |

TABLE 3-continued

| | Toner production method | First crystalline material Kind | Number of parts (part(s) by mass) | Second crystalline material Kind | Number of parts (part(s) by mass) | Colorant Kind | Number of parts (part(s) by mass) | Stirrer in dispersion step and adjustment step |
|---|---|---|---|---|---|---|---|---|
| particles 17 | polymerization | | | | | material 9 | | |
| Toner particles 18 | Suspension polymerization | 4 | 10 | 3 | 5 | Magnetic material 10 | 40 | Cavitron |
| Toner particles 19 | Suspension polymerization | 4 | 10 | 3 | 5 | Magnetic material 11 | 40 | Cavitron |
| Toner particles 20 | Suspension polymerization | 4 | 10 | 3 | 5 | Magnetic material 12 | 40 | Cavitron |
| Toner particles 21 | Suspension polymerization | 4 | 10 | 3 | 5 | Magnetic material 13 | 40 | Cavitron |
| Toner particles 22 | Emulsion aggregation | — | — | — | — | PB15:3 | — | — |
| Toner particles 23 | Suspension polymerization | 1 | 10 | 3 | 5 | Magnetic material 14 | 100 | Cavitron |
| Toner particles 24 | Suspension polymerization | 1 | 10 | 3 | 5 | Magnetic material 15 | 100 | Cavitron |
| Toner particles 25 | Suspension polymerization | 1 | 10 | 3 | 5 | Magnetic material 16 | 100 | Cavitron |
| Toner particles 26 | Suspension polymerization | 1 | 10 | 3 | 5 | Magnetic material 17 | 100 | Cavitron |
| Toner particles 27 | Emulsion aggregation | 4 | — | — | — | PB15:3 | — | — |
| Toner particles 28 | Pulverization | 4 | — | — | — | Magnetic material 14 | — | — |

TABLE 4

| Toner No. | Toner particles No. | Particle diameter (μm) | $S_1$ (%) | $S_2$ (%) | $R_2$ (nm) | $R_i$ (nm) | $R_i < R_2$ is satisfied | Crystalline material contains ester wax | Surface vicinity existence index |
|---|---|---|---|---|---|---|---|---|---|
| Toner 1 | Toner particles 1 | 7.5 | 0.1 | 1.9 | 90 | 70 | YES | YES | 6 |
| Toner 2 | Toner particles 2 | 7.4 | 0 | 1.8 | 110 | 70 | YES | YES | 5 |
| Toner 3 | Toner particles 3 | 7.1 | 0.1 | 2 | 100 | 70 | YES | YES | 5.8 |
| Toner 4 | Toner particles 4 | 7.6 | 0.1 | 1.5 | 80 | 70 | YES | YES | 4 |
| Toner 5 | Toner particles 5 | 7.4 | 0.1 | 2.6 | 120 | 70 | YES | YES | 8 |
| Toner 6 | Toner particles 6 | 7.4 | 0.1 | 1 | 80 | 70 | YES | YES | 3.5 |
| Toner 7 | Toner particles 7 | 7.3 | 0.1 | 3.4 | 120 | 70 | YES | YES | 8.5 |
| Toner 8 | Toner particles 8 | 7.2 | 0.2 | 1.4 | 130 | 80 | YES | YES | 3.2 |
| Toner 9 | Toner particles 9 | 7.2 | 0.2 | 1.3 | 60 | 70 | NO | NO | 3.2 |
| Toner 10 | Toner particles 10 | 7.2 | 0.3 | 1.3 | 60 | 70 | NO | NO | 3.8 |
| Toner11 | Toner particles 11 | 7.3 | 0.5 | 1.5 | 60 | 70 | NO | NO | 3.5 |
| Toner 12 | Toner particles 12 | 7.2 | 0.3 | 1.4 | 60 | 70 | NO | NO | 2.8 |
| Toner 13 | Toner particles 13 | 7.1 | 0.3 | 1.3 | 60 | 70 | NO | NO | 2.5 |
| Toner 14 | Toner particles 14 | 7.2 | 0.4 | 3.2 | 70 | 70 | NO | NO | 3.5 |
| Toner 15 | Toner particles 15 | 7.5 | 0.3 | 1.3 | 60 | 70 | NO | NO | 2.6 |
| Toner 16 | Toner particles 16 | 7.4 | 0.3 | 1.2 | 60 | 70 | NO | NO | 2.2 |
| Toner 17 | Toner particles 17 | 7.2 | 0.5 | 3.5 | 70 | 70 | NO | NO | 3.6 |
| Toner 18 | Toner particles 18 | 7.2 | 0.3 | 1.1 | 60 | 70 | NO | NO | 2.3 |
| Toner 19 | Toner particles 19 | 7.4 | 0.3 | 5.1 | 70 | 70 | NO | NO | 2.1 |

TABLE 4-continued

| Toner No. | Toner particles No. | Particle diameter (μm) | $S_1$ (%) | $S_2$ (%) | $R_2$ (nm) | $R_i$ (nm) | $R_i < R_2$ is satisfied | Crystalline material contains ester wax | Surface vicinity existence index |
|---|---|---|---|---|---|---|---|---|---|
| Toner 20 | Toner particles 20 | 7.4 | 0.3 | 1 | 60 | 60 | NO | NO | 3.4 |
| Toner 21 | Toner particles 21 | 7.2 | 0.3 | 6.2 | 130 | 70 | YES | NO | 2.4 |
| Toner 22 | Toner particles 22 | 7.2 | 0.5 | 1 | 200 | 100 | YES | NO | — |
| Toner 23 | Toner particles 23 | 7.2 | 0 | 0.1 | 10 | 60 | NO | YES | 6.3 |
| Toner 24 | Toner particles 24 | 7.2 | 0.1 | 0.1 | 10 | 60 | NO | YES | 5.8 |
| Toner 25 | Toner particles 25 | 7.3 | 0.2 | 0.2 | 20 | 60 | NO | YES | 6.6 |
| Toner 26 | Toner particles 26 | 7.2 | 0.7 | 0.9 | 240 | 80 | YES | YES | 1.8 |
| Toner 27 | Toner particles 27 | 7.2 | 0.1 | 0.2 | 240 | 110 | YES | NO | — |
| Toner 28 | Toner particles 28 | 7.4 | 0.9 | 1.2 | 250 | 150 | YES | NO | — |

TABLE 5

| | | Solid image unevenness (Smoothness: 45 sec) | | Halftone image unevenness (Smoothness: 45 sec) | | Solid image unevenness (Smoothness: 25 sec) | | Low-temperature fixability |
|---|---|---|---|---|---|---|---|---|
| Example 1 | Toner 1 | A | 0.3 | A | 0.3 | A | 0.5 | A |
| Example 2 | Toner 2 | A | 0.3 | A | 0.3 | A | 0.5 | A |
| Example 3 | Toner 3 | A | 0.4 | A | 0.3 | A | 0.4 | A |
| Example 4 | Toner 4 | A | 0.5 | A | 0.3 | A | 0.6 | A |
| Example 5 | Toner 5 | A | 0.6 | A | 0.3 | A | 0.7 | A |
| Example 6 | Toner 6 | A | 0.3 | A | 0.4 | B | 1.2 | A |
| Example 7 | Toner 7 | A | 0.4 | A | 0.3 | B | 1.2 | A |
| Example 8 | Toner 8 | A | 0.6 | A | 0.4 | B | 1.4 | A |
| Example 9 | Toner 9 | A | 0.7 | B | 1.3 | B | 1.4 | B |
| Example 10 | Toner 10 | B | 1.2 | B | 1.2 | B | 1.5 | B |
| Example 11 | Toner 11 | B | 1.3 | B | 1.4 | B | 1.6 | B |
| Example 12 | Toner 12 | B | 1.3 | B | 1.4 | B | 1.7 | B |
| Example 13 | Toner 13 | B | 1.4 | B | 1.4 | B | 1.4 | B |
| Example 14 | Toner 14 | B | 1.6 | B | 1.4 | B | 1.8 | B |
| Example 15 | Toner 15 | B | 1.3 | B | 1.4 | B | 1.6 | B |
| Example 16 | Toner 16 | B | 1.4 | B | 1.4 | B | 1.7 | B |
| Example 17 | Toner 17 | B | 1.3 | B | 1.4 | B | 1.4 | B |
| Example 18 | Toner 18 | B | 1.4 | B | 1.4 | C | 2.2 | B |
| Example 19 | Toner 19 | B | 1.3 | B | 1.4 | C | 2.4 | B |
| Example 20 | Toner 20 | C | 2.2 | B | 1.9 | C | 2.6 | B |
| Example 21 | Toner 21 | C | 2.4 | B | 1.6 | C | 2.8 | B |
| Example 22 | Toner 22 | C | 2.3 | B | 1.6 | C | 2.8 | B |
| Comparative Example 1 | Toner 23 | D | 3.6 | D | 2.8 | D | 3.8 | C |
| Comparative Example 2 | Toner 24 | D | 3.7 | D | 2.7 | D | 3.9 | C |
| Comparative Example 3 | Toner 25 | D | 3.8 | D | 2.6 | D | 3.9 | C |
| Comparative Example 4 | Toner 26 | E | 4.6 | E | 3.2 | E | 5.2 | C |
| Comparative Example 5 | Toner 27 | D | 3.8 | D | 2.5 | E | 4.6 | D |
| Comparative Example 6 | Toner 28 | D | 3.8 | D | 2.6 | E | 4.8 | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-199150, filed Nov. 30, 2020, which is hereby incorporated by reference herein in its entirety.

What is claimed is:

1. A toner, comprising:

a toner particle comprising a binder resin, a crystalline material and a colorant;

the crystalline material being a wax or a crystalline polyester resin; and the colorant being a hydrophobized magnetic material that is hydrophobic-treated with a silane coupling agent, wherein $$0.0 \le S_1 \le 0.5$$

$$1.0 \le S_2 \le 10.0, \text{ and}$$

$$20 \le R_2 \le 200$$

when $S_1$ (%) is a ratio of an area occupied by the crystalline material per area of a toner particle surface observed with a scanning electron microscope (SEM) after ruthenium-staining the toner in a ruthenium tetroxide ($RuO_4$) gas atmosphere at 100 Pa for 5 minutes, and $S_2$ (%) is a ratio of an area occupied by the crystalline material per area of the toner particle surface and $R_2$ (nm) is a dispersion diameter of a plurality of domains formed of the crystalline material on the toner particle surface, observed with the scanning electron microscope (SEM) after ruthenium-staining the toner in the ruthenium tetroxide ($RuO_4$) gas atmosphere at 500 Pa for 15 minutes.

2. The toner according to claim 1, wherein $R_i<R_2$ when $R_i$ (nm) is a dispersion diameter of a plurality of internal domains formed in a cross-section of the toner particle cut with a microtome and observed with a transmission electron microscope (TEM) after ruthenium-staining the toner in the ruthenium tetroxide ($RuO_4$) gas atmosphere at 500 Pa for 15 minutes.

3. The toner according to claim 1, wherein the wax is an ester wax.

4. The toner according to claim 1, wherein a peak intensity ratio [Si—O—Si]/[Si—C] of ATR-IR of a component extracted from the hydrophobized magnetic material with toluene is 1.4 to 2.5.

5. The toner according to claim 1, wherein the hydrophobized magnetic material has a surface vicinity existence index of 4.0 to 8.0 pieces/1 $\mu m^2$ obtained by observing the toner particle with the scanning electron microscope (SEM).

6. The toner according to claim 1, wherein the hydrophobized magnetic material has a hydrophobizing degree of 55 to 80.

7. The toner according to claim 1, wherein a value (mass change ratio/specific surface area) is 0.002 to 0.020%·g/$m^2$, obtained by dividing a mass change ratio of the hydrophobized magnetic material when the hydrophobized magnetic material is left to stand under an environment of a temperature of 30° C. and a relative humidity of 0% for 24 hours and then left to stand under an environment of a temperature of 30° C. and a relative humidity of 80% for 1 hour, by a specific surface area of the hydrophobized magnetic material.

8. The toner according to claim 1, wherein, in the hydrophobized magnetic material, a spectrum of Si obtained based on a total electron yield (TEY) method using a near-edge X-ray absorption fine structure (NEXAFS) has a peak A in a range of 1,844.4 to 1,844.8 eV, a peak B in a range of 1,846.1 to 1,846.6 eV, and $I_A/(I_A+I_B)/M_{Si}$ is 40 to 55 when $I_A$ is an area of the peak A, $I_B$ is an area of the peak B, and $M_{Si}$ is the number of moles of Si derived from a silane compound contained in 1 g of the hydrophobized magnetic material.

* * * * *